United States Patent
Kumar et al.

(10) Patent No.: US 8,916,294 B2
(45) Date of Patent: Dec. 23, 2014

(54) FLUORINE DOPED LITHIUM RICH METAL OXIDE POSITIVE ELECTRODE BATTERY MATERIALS WITH HIGH SPECIFIC CAPACITY AND CORRESPONDING BATTERIES

(75) Inventors: Sujeet Kumar, Newark, CA (US); Herman Lopez, Sunnyvale, CA (US); Subramanian Venkatachalam, Pleasanton, CA (US); Deepak Karthikeyan, Foster City, CA (US)

(73) Assignee: Envia Systems, Inc., Hayward, CA (US)

( * ) Notice: Subject to any disclaimer, the term of this patent is extended or adjusted under 35 U.S.C. 154(b) by 1041 days.

(21) Appl. No.: 12/569,606

(22) Filed: Sep. 29, 2009

(65) Prior Publication Data

US 2010/0086854 A1    Apr. 8, 2010

Related U.S. Application Data

(60) Provisional application No. 61/101,432, filed on Sep. 30, 2008.

(51) Int. Cl.
| | | |
|---|---|---|
| *H01M 4/13* | (2010.01) | |
| *H01M 4/505* | (2010.01) | |
| *H01M 4/36* | (2006.01) | |
| *H01M 10/052* | (2010.01) | |
| *H01M 4/1315* | (2010.01) | |
| *H01M 4/525* | (2010.01) | |
| *H01M 10/0525* | (2010.01) | |
| *C01G 53/00* | (2006.01) | |

(52) U.S. Cl.
CPC ............. *H01M 4/505* (2013.01); *H01M 4/366* (2013.01); *H01M 10/052* (2013.01); *H01M 4/1315* (2013.01); *H01M 4/525* (2013.01); *H01M 10/0525* (2013.01); *Y02E 60/122* (2013.01); *C01G 53/50* (2013.01); *C01P 2002/50* (2013.01); *C01P 2002/72* (2013.01); *C01P 2006/40* (2013.01)
USPC ... 429/231.95; 429/223; 429/224; 429/231.3; 429/231.6; 429/213.95

(58) Field of Classification Search
CPC ... H01M 4/366; H01M 4/1315; H01M 4/505; H01M 4/525; H01M 10/052
USPC .............. 429/223, 224, 231.3, 231.6, 231.95
See application file for complete search history.

(56) References Cited

U.S. PATENT DOCUMENTS

| | | | |
|---|---|---|---|
| 5,658,693 A | 8/1997 | Thackeray et al. | |
| 5,674,645 A | 10/1997 | Amatucci et al. | |
| 6,037,095 A | 3/2000 | Miyasaka | |
| 6,045,948 A | 4/2000 | Wang et al. | |
| 6,087,042 A | 7/2000 | Sugiyama et al. | |
| 6,168,887 B1 | 1/2001 | Dahn et al. | |
| 6,183,718 B1 | 2/2001 | Barker et al. | |
| 6,248,477 B1 | 6/2001 | Howard, Jr. et al. | |
| 6,251,822 B1 | 6/2001 | Peng et al. | |
| 6,322,744 B1 | 11/2001 | Kelley et al. | |
| 6,372,385 B1 | 4/2002 | Kweon et al. | |
| 6,420,071 B1 | 7/2002 | Lee et al. | |
| 6,428,766 B1 | 8/2002 | Fujino et al. | |
| 6,489,060 B1 | 12/2002 | Zhang et al. | |
| 6,528,208 B1 | 3/2003 | Thackeray et al. | |
| 6,589,499 B2 | 7/2003 | Gao et al. | |
| 6,596,435 B2 | 7/2003 | Kelley et al. | |
| 6,660,432 B2 | 12/2003 | Paulsen et al. | |
| 6,677,082 B2 | 1/2004 | Thackeray et al. | |
| 6,680,143 B2 | 1/2004 | Thackeray et al. | |
| 6,730,429 B2 | 5/2004 | Thackeray et al. | |
| 6,749,648 B1 | 6/2004 | Kumar et al. | |
| 6,872,491 B2 | 3/2005 | Kanai et al. | |
| 6,964,828 B2 | 11/2005 | Lu et al. | |
| 7,026,074 B2 | 4/2006 | Chen et al. | |
| 7,078,128 B2 | 7/2006 | Lu et al. | |
| 7,135,252 B2 | 11/2006 | Thackeray et al. | |
| 7,205,072 B2 | 4/2007 | Kang et al. | |
| 7,285,357 B2 | 10/2007 | Jordy et al. | |
| 7,364,793 B2 | 4/2008 | Paulsen et al. | |

(Continued)

FOREIGN PATENT DOCUMENTS

| | | |
|---|---|---|
| CN | 1130810 A | 11/1996 |
| EP | 2264814 A1 | 12/2010 |

(Continued)

OTHER PUBLICATIONS

Boulineau et al., "Reinvestigation of Li2MnO3 Structure: Electron Diffraction and High Resolution TEM," Chem. Mater. 2009, 21, 4216-4222.

(Continued)

*Primary Examiner* — Ladan Mohaddes
(74) *Attorney, Agent, or Firm* — Dardi & Herbert, PLLC; Peter S. Dardi; Kayla J. Fossen

(57) ABSTRACT

Lithium rich metal oxyfluorides are described with high specific capacity and, good cycling properties. The materials have particularly good high rate capabilities. The fluorine dopant can be introduced in a low temperature process to yield the materials with desirable cycling properties. In some embodiments, the positive electrode active materials have a composition represented approximately by the formula $Li_{1+x}Ni_\alpha Mn_\beta Co_\gamma A_\delta O_{2-z}F_z$ where:

x is from about 0.02 to about 0.19,
$\alpha$ is from about 0.1 to about 0.4,
$\beta$ is from about 0.35 to about 0.869,
$\gamma$ is from about 0.01 to about 0.2,
$\delta$ is from 0.0 to about 0.1 and
z is from about 0.01 to about 0.2, where A is Mg, Zn, Al, Ga, B, Zr, Ti, Ca, Ce, Y, Nb or combinations thereof.

24 Claims, 16 Drawing Sheets

(56) References Cited

U.S. PATENT DOCUMENTS

| | | | |
|---|---|---|---|
| 7,368,071 B2 | 5/2008 | Dahn et al. | |
| 7,393,476 B2 | 7/2008 | Shiozaki et al. | |
| 7,416,813 B2 | 8/2008 | Fujihara et al. | |
| 7,435,402 B2 | 10/2008 | Kang et al. | |
| 7,452,631 B2 | 11/2008 | Kitao et al. | |
| 7,468,223 B2 | 12/2008 | Thackeray et al. | |
| 7,507,503 B2 | 3/2009 | Amine et al. | |
| 7,517,613 B2 | 4/2009 | Yuasa et al. | |
| 7,674,557 B2 | 3/2010 | Sun et al. | |
| 7,927,506 B2 | 4/2011 | Park | |
| 7,935,270 B2 | 5/2011 | Park | |
| 2002/0055042 A1 | 5/2002 | Kweon et al. | |
| 2002/0114995 A1 | 8/2002 | Thackeray et al. | |
| 2003/0082448 A1 | 5/2003 | Cho et al. | |
| 2003/0087155 A1 | 5/2003 | Cho et al. | |
| 2003/0108790 A1 | 6/2003 | Manthiram et al. | |
| 2004/0076884 A1 | 4/2004 | Lee et al. | |
| 2004/0091779 A1 | 5/2004 | Kang et al. | |
| 2004/0151951 A1 | 8/2004 | Hyung et al. | |
| 2005/0019670 A1 | 1/2005 | Amine et al. | |
| 2005/0031942 A1 | 2/2005 | Hennige et al. | |
| 2005/0202316 A1 | 9/2005 | Hwang et al. | |
| 2006/0051671 A1 | 3/2006 | Thackeray et al. | |
| 2006/0051673 A1 | 3/2006 | Johnson et al. | |
| 2006/0083991 A1 | 4/2006 | Ahn et al. | |
| 2006/0147809 A1 | 7/2006 | Amine et al. | |
| 2006/0188781 A1 | 8/2006 | Thackeray et al. | |
| 2006/0257743 A1 | 11/2006 | Kuratomi et al. | |
| 2006/0275667 A1 | 12/2006 | Watanabe et al. | |
| 2007/0072080 A1 | 3/2007 | Inagaki et al. | |
| 2007/0111098 A1 | 5/2007 | Yang Kook et al. | |
| 2007/0202405 A1 | 8/2007 | Shizuka et al. | |
| 2007/0292757 A1 | 12/2007 | Watanabe et al. | |
| 2008/0102369 A1 | 5/2008 | Sakata et al. | |
| 2008/0107968 A1 | 5/2008 | Patoux et al. | |
| 2008/0118847 A1 | 5/2008 | Jung et al. | |
| 2008/0135802 A1 | 6/2008 | Saito et al. | |
| 2008/0157027 A1 | 7/2008 | Manthiram et al. | |
| 2008/0193841 A1 | 8/2008 | Sun et al. | |
| 2008/0241693 A1 | 10/2008 | Fukuchi et al. | |
| 2008/0268347 A1 | 10/2008 | Ohzuku et al. | |
| 2009/0072818 A1 | 3/2009 | Mizuno et al. | |
| 2009/0087362 A1 | 4/2009 | Sun et al. | |
| 2009/0155694 A1 | 6/2009 | Park | |
| 2009/0263707 A1 | 10/2009 | Buckley et al. | |
| 2009/0297947 A1 | 12/2009 | Deng et al. | |
| 2009/0305131 A1 | 12/2009 | Kumar et al. | |
| 2010/0086853 A1 | 4/2010 | Venkatachalam et al. | |
| 2010/0119942 A1 | 5/2010 | Kumar | |
| 2010/0151332 A1 | 6/2010 | Lopez et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0111294 A1 | 5/2011 | Lopez et al. | |
| 2011/0111298 A1 | 5/2011 | Lopez et al. | |
| 2011/0136019 A1 | 6/2011 | Amiruddin et al. | |
| 2011/0236751 A1 | 9/2011 | Amiruddin et al. | |
| 2011/0244331 A1 | 10/2011 | Karthikeyan et al. | |
| 2012/0028105 A1 | 2/2012 | Kumar et al. | |
| 2012/0056590 A1 | 3/2012 | Amiruddin et al. | |
| 2012/0070725 A1 | 3/2012 | Venkatachalam et al. | |

FOREIGN PATENT DOCUMENTS

| | | |
|---|---|---|
| JP | 57065674 A2 | 4/1982 |
| JP | 06-243871 | 9/1994 |
| JP | 09-045373 A | 2/1997 |
| JP | 10-255837 A | 9/1998 |
| JP | 3112138 | 9/2000 |
| JP | 2002-110167 | 4/2002 |
| JP | 3506397 | 12/2003 |
| JP | 2006-134816 | 5/2006 |
| JP | 2006-344425 A | 12/2006 |
| JP | 2007-220630 | 8/2007 |
| JP | 3276451 | 2/2008 |
| JP | 2008-536285 A | 9/2008 |
| JP | 2008-258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 | 1/2008 |
| KR | 10-0822013 B1 | 4/2008 |
| KR | 10-2008-0099132 A | 11/2008 |
| KR | 10-2009-0078128 A | 7/2009 |
| WO | 99/60638 A1 | 11/1999 |
| WO | 01/35473 A1 | 5/2001 |
| WO | 01/91209 A1 | 11/2001 |
| WO | 20041084330 A2 | 9/2004 |
| WO | 2006/025707 A1 | 3/2006 |
| WO | 2006/109930 A1 | 10/2006 |
| WO | 2006/137673 A1 | 12/2006 |
| WO | 2008086041 A1 | 7/2008 |

OTHER PUBLICATIONS

Hong et al., "Structural evolution of layered $Li1.2Ni0.2Mn0.6O2$ upon electrochemical cycling in a Li rechargeable battery," J. Mater. Chem., 2010, 20, 10179-10186.

Johnson et al., "Lithium-manganese oxide electrodes with layered-spinel composite structures $xLi2MnO3 \cdot (1-x)Li1+yMn2-yO4$ ($0<x<1$, $0 \leq y \leq 0.33$) for lithium batteries," Electrochemistry Communications 7 (2005) 528-536.

Kang et al., "The Effects of Acid Treatment on the Electrochemical Properties of $0.5 Li2MnO3 \cdot 0.5 LiNi0.44Co0.25Mn0.3102$ Electrodes in Lithium Cells," Journal of the Electrochemical Society 153(6):A1186-A1192 (2006).

Park et al, "Physical and electrochemical properties of spherical $Li1+x(Ni1/3Co1/3Mn1/3)1-xO2$ cathode materials", Journal of Power Sources, 177:177-183 (2008).

Robertson et al., "Mechanism of Electrochemical Activity in $Li2MnO3$," Chem. Mater. 2003, 15, 1984-1992.

Yabuuchi et al., "Detailed Studies of a High-Capacity Electrode Material for Rechargeable Batteries, $Li2MnO3-LiCo1/3Ni1/3Mn1/3O2$," J. Am. Chem. Soc. 2011, 133, 4404-4419.

International Search Report and Written Opinion for International Application No. PCT/US2009/058840, dated Sep. 29, 2009.

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of $LiNi0.5Mn1.5O4$ and carbon electrodes for lithium-ion 5-V cells," J. of Power Sources 162 (2006) 780-789.

Aurbach et al., "On the capacity fading of $LiCoO2$ intercalation electrodes: the effect of cycling, storage, temperature, and surface film forming additives," Electrochimica Acta 47 (2002) 4291-4306.

Chen et al., "Studies of $LiCoO2$ Coated with Metal Oxides," Electrochemical and Solid State Letters, 6 (11) A221-A224 (2003).

Chen et al., "Effect of a $ZrO2$ Coating on the Structure and Electrochemistry of $LixCoO2$ When Cycled to 4.5 V," Electrochemical and Solid-State Letters , 5 (10) A213-A216 (2002).

Cho et al., "Comparison of $Al2O3$- and $AlPO4$-coated $LiCoO2$ cathode materials for a Li-ion cell," J. of Power Sources 146 (2005) 58-64.

Cho et al., "$LiCoO2$ Cathode Material That Does Not Show a Phase Transition from Hexagonal to Monoclinic Phase," J. of the Electrochemical Society, 148 (10) A1110-A1115 (2001).

Cho et al., "High-Performance $ZrO2$-Coated $LiNiO2$ Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel $LiCoO2$ Cathode Material with $Al2O3$ Coating for a Li Ion Cell," Chem. Mater. 2000, 12 (12), 3788-3791.

Fey et al., "Enhanced cyclability of $LiCoO2$ cathodes coated with alumina derived from carboxylate-alumoxanes," J. of Applied Electrochemistry (2005) 35:177-184.

(56) References Cited

OTHER PUBLICATIONS

Fey et al., "Preformed boehmite nanoparticles as coating materials for long-cycling LiCoO2," J. of Applied Electrochemistry 34:715-722 (2004).
Fey et al., "A simple mechano-thermal coating process for improved lithium battery cathode materials," J. of Power Sources 132 (2004) 172-180.
Fey et al., "Saturated linear dicarboxylic acids as chelating agents for the sol-gel synthesis of LiNi0.8Co0.2O2," Materials Chemistry and Physics 87 (2004) 246-255.
Ho et al., "Application of A-C Techniques to the Study of Lithium Diffusion in Tungsten Trioxide Thin Films," J. Electrochem. Soc., 1980; 127(2):343-350.
Ito et al., "The relationship between crystal structure and the electrochemical reaction of Li-rich insertion materials (2)" 2010. (English Abstract).
Johnson et al. "The significance of the Li2MnO3 component in 'composite' xLi2MnO3 • (1-x)LiMn0.5Ni0.5O2 electrodes," Electrochemistry Communications 6 (2004) 1085-1091.
Kim et al., "Remarkable improvement in cell safety for Li[Ni0.5Co0.2Mn0.3]O2 coated with LiFePO4," Journal of Alloys and Compounds 492 (2010) L87-L90.
Kim et al., "Electrochemical and Structural Properties of xLi2M'O3•(1-x)LiMn0.5NiO.5O2 Electrodes for Lithium Batteries (M' = Ti, Mn, Zr; 0 ≤ x ≤ 0.3)" Chem. Mater. 2004, 16, 1996-2006.
Kim et al., "Electrochemical Stability of Thin-Film LiCoO2 Cathodes by Aluminum-Oxide Coating," Chem. Mater. 2003, 15(7):1505-1511.
Lee et al., "Electrochemical characteristics of Al2O3-coated lithium manganese spinel as a cathode material for a lithium secondary battery," J. of Power Sources 126 (2004) 150-155.
Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).
Okumura et al., "Cathode having high rate performance for a secondary Li-ion cell surface-modified by aluminum oxide nanoparticles," J. of Power Sources 189 (2009) 471-475.
Ohsawa et al., "The relationship between crystal structure and the electrochemical reaction of Li-rich insertion materials (1)," 2010. (English Abstract).
Park et al., "Lithium-manganese-nickel-oxide electrodes with integrated layered-spinel structures for lithium batteries," Electrochemistry Communications 9 (2007) 262-268.
Song et al., "Two- and three-electrode impedance spectroscopy of lithium-ion batteries," J. of Power Sources, 2002; 111:255-267.
Sun et al., "The preparation and electrochemical performance of solid solutions LiCoO2-Li2MnO3 as cathode materials for lithium ion batteries," J of Power Sources 159 (2006) 1353-1359.
Thackeray et al., "Advances in manganese-oxide 'composite' electrodes for lithium-ion batteries," J. Mater. Chem., 2005,15, 2257-2267.
Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).
Yabuuchi et al., "Study of LiMnO3-Li(Co1/3Ni1/3Mn1/3)O2 for High Capacity Positive Electrode Material: II. Redox Reaction at the Positive Electrode/Electrolyte Interface," 2010. (English Abstract).
Yoshii et al., "Study of LiMnO3-Li(Co1/3Ni1/3Mn1/3)O2 for High Capacity Positive Electrode Material: I. Change in the Crystal and Electronic Structure upon Li de-intercalation," 2010. (English Abstract).
Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).
Hwang et al. "Influence of Mn content on the morphology and electrochemical performance of LiNi1-x-yCoxMnyO2 cathode materials," J. Mater. Chem. 2003; 13:1962-1968.
Thackeray et al., "Li2MnO3-stabilized LiMO2 (M = Mn, Ni, Co) electrodes for lithium-ion batteries," J. Mater. Chem., 2007; 17:3112-3125.
Lopez et al., pending U.S. Appl. No. 12/332,735, "Positive Electrode Materials for High Discharge Capacity Lithium Ion Batteries," filed Dec. 11, 2008.
Venkatachalam et al., pending U.S. Appl. No. 12/246,814, "Positive Electrode Materials for Lithium Ion Batteries Having a High Specific Discharge Capacity and Processes for the Synthesis of These Materials," filed Oct. 7, 2008.
Choi et al., "Superior Capacity Retention Spinel Oxyfluoride Cathodes for Lithium-Ion Batteries," Electrochemical and Solid-State Letters 9 (5) (2006) A245-A248.
Kang et al., "Enchanting the rate capability of high capacity xLi2MnO3 . (1-x)LiMO2 (M=Mn, Ni, Co) electrodes by Li-Ni-PO4 treatment," Electrochemistry Communications 11 (2009) 748-751.
Kang et al., "Layered Li(Li0.2Ni0.15+0.5zCo0.10Mn0.55-0.5z)o2-zFz cathode materials for Li-ion secondary batteries," Journal of Power Sources 146 (2005) 654-657.
Kim et al., "Synthesis of spherical Li{ni(1/3-z)Co(1/3-z)Mn(1/3-z)Mgz]O2 as positive electrode material for lithium ion battery," Electrchemica Acta 51 (2006)2447-2453.
Kim et al. "Improvement of High-Voltage Cycling Behavior of Surface Modified Li[Ni1/3Co1/3Mn1/3]o2 Cathodes by Fluorine Sustitution for Li-Ion Batteries," Journal of the Electrochemical Society 152 (9) A1701-A1713 (2005).
Lee et al., "High capacity Li[Li0.2Ni0.2Mn0.6]O2 cathode materials via a carbonate co-precipitation method," J. of Power Sources, 162 (2006), 1346-1350.
Luo et al., "On the incorporation of fluorine into the manganese spinel cathode lattice," Solid State Ionics 180 (2009) 703-707.
Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).
Sun et al., "Significant Improvement of high voltage cycling behavior AlF3-coated LiCoO2 cathode," Electrochemistry Communications 8 (2006) 821-826.
Thackeray et al., "Comments on the structural complexity of lithium-rich Li1+xM1-xO2 electrodes (M=Mn,Ni,Co) for lithium batteries," Electrochemistry Communications 8 (2006), 1531-1538.
Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).
Ito et al., "Cyclic deterioration and it's improvement for Li-rich layered cathode material Li [Ni0.17Li0.2Co0.07Mn0.56]O2," Journal of Power Sources, 195: 567-573 (2010).
Ito et al., "A new approach to improve the high-voltage cyclic performance of Li-rich layered cathode material by electrochemical pretreatment," Journal of Power Sources 183: 344-346 (2008).
Jouanneau et al., "Influence of LiF additions on Li[NixCo1-2xMnx]O2 Materials: Sintering, Structure, and Lithium Insertion Properties," Journal of the Electrochemical Society, 151:10 A1749-A1754 (2004).
Shin et al., "Improvement of electrochemical properties of Li[Ni0.4Co0.2Mn(0.4-x)]O2-yFy cathode materials at high voltage region", Electrochimica Acta 52 1477-1482 (2006).
Extended Search Report for European Patent Application No. 09818383.3, mailed on Jul. 27, 2012 (9 pages).
Office Action for corresponding Chinese Application No. 200980138690.4, mailed Mar. 8, 2013 (25 pages).

XRD of Samples $Li_{1.167}Ni_{0.219}Co_{0.125}Mn_{0.490}O_{2-F}F_F$

XRD of Samples $Li_{1.13}Ni_{0.266}Co_{0.152}Mn_{0.451}O_{2-F}F_F$

XRD of Samples $Li_{1.090}Ni_{0.318}Co_{0.182}Mn_{0.409}O_{2-F}F_F$ $Li_{1.20}Ni_{0.175}Co_{0.10}Mn_{0.525}O_{2-F}F_F$ – *F source - LiF*

$Li_{1.130}Ni_{0.266}Co_{0.152}Mn_{0.451}O_{2-F}F_F$ - F source – $NH_4HF_2$ $Li_{1.090}Ni_{0.318}Co_{0.182}Mn_{0.409}O_{2-F}F_F$ - F source – $NH_4HF_2$

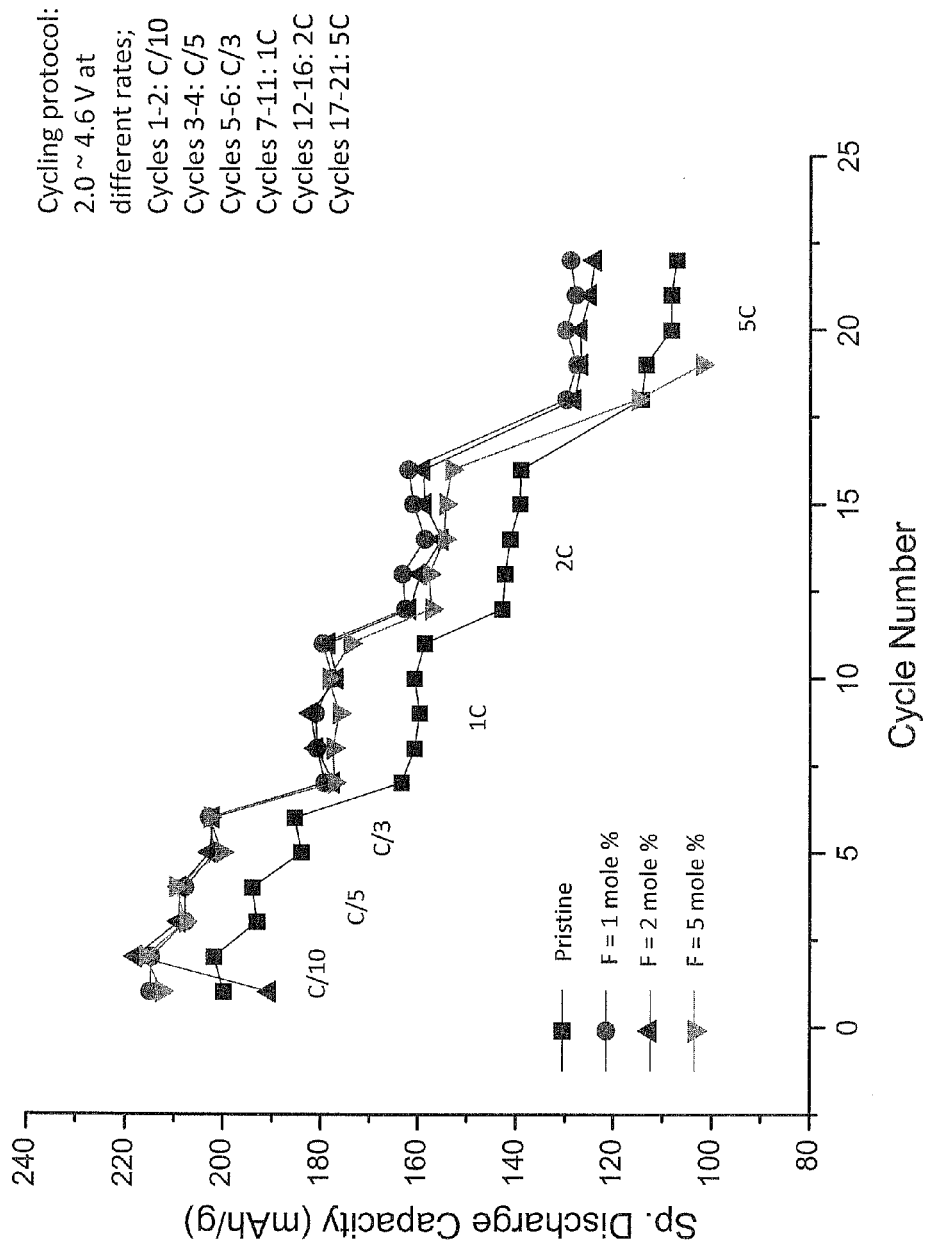

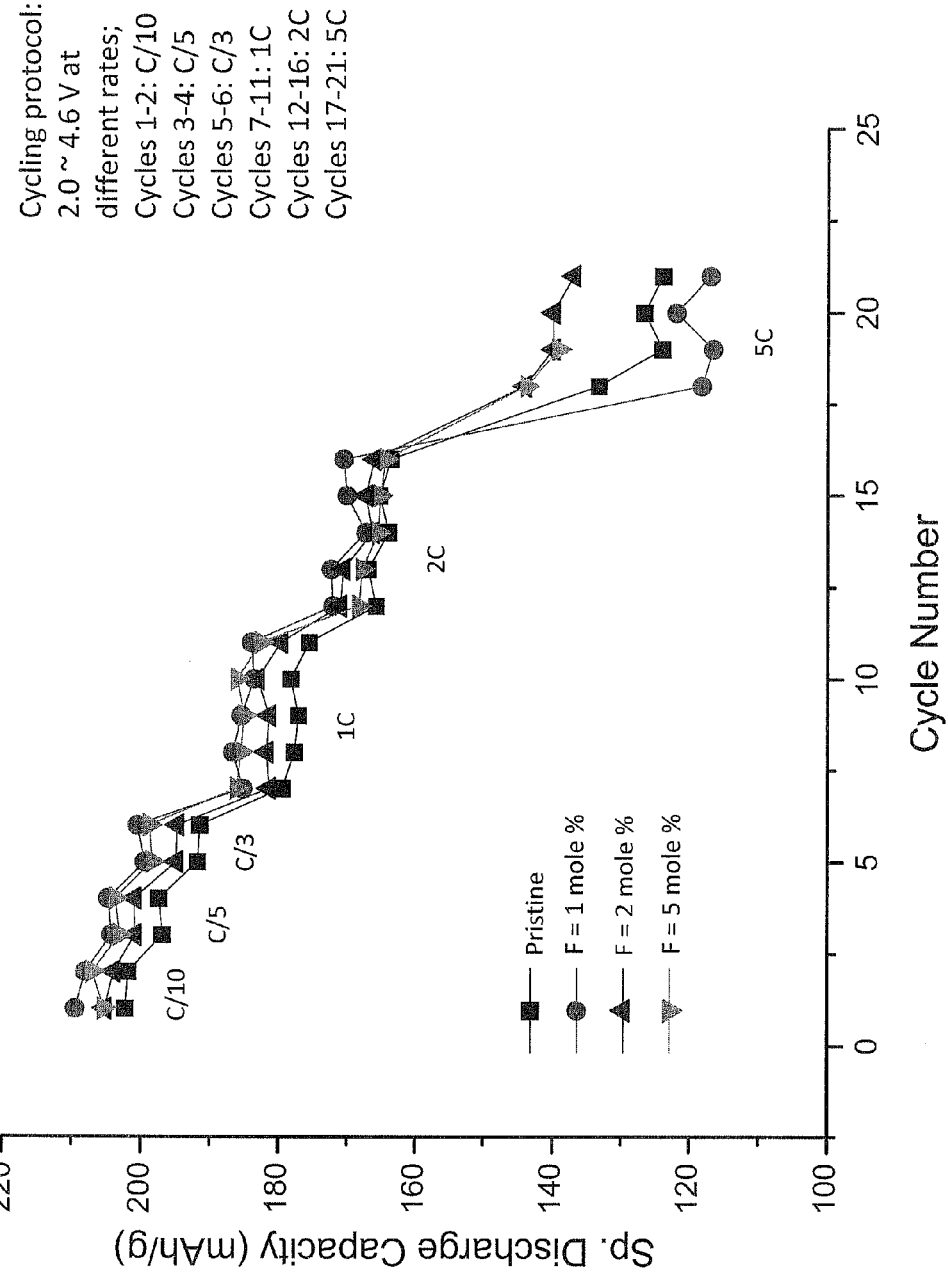

FLUORINE DOPED LITHIUM RICH METAL OXIDE POSITIVE ELECTRODE BATTERY MATERIALS WITH HIGH SPECIFIC CAPACITY AND CORRESPONDING BATTERIES

CROSS REFERENCE TO RELATED APPLICATIONS

This application claims priority to copending U.S. provisional patent application 61/101,432, filed Sep. 30, 2008 to Kumar entitled "Layered Lithium Metal Oxide Cathode Battery Materials With High Energy Density," incorporated herein by reference.

FIELD OF THE INVENTION

The invention relates to lithium rich metal oxide compositions with a fluorine dopant having high capacities. The invention further relates to lithium secondary batteries formed with the fluorine doped compositions as a positive electrode active material. In addition, the invention relates to low temperature synthesis methods for forming fluorine doped lithium rich metal oxides.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that incorporates lithium when the battery is charged. For some current commercial batteries, the negative electrode material can be graphite, and the positive electrode material can comprise lithium cobalt oxide ($LiCoO_2$). In practice, only a modest fraction of the theoretical capacity of the cathode generally can be used. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to an electroactive composition comprising a crystalline material approximately represented by a formula $Li_{1+x}Ni_\alpha Mn_\beta Co_\gamma A_\delta O_{2-z}F_z$ where:
x is from about 0.02 to about 0.19,
α is from about 0.1 to about 0.4,
β is from about 0.35 to about 0.869,
γ is from about 0.01 to about 0.2, δ is from 0.0 to about 0.1 and
z is from about 0.01 to about 0.2,
where A is Mg, Zn, Al, Ga, B, Zr, Ti, Ca, Ce, Y, Nb or combinations thereof.

In a further aspect, the invention pertains to a method for synthesizing an oxyfluoride composition, the method comprising heating a fluorine source in contact with a metal oxide approximately represented by a formula $Li_{1+x}Ni_\alpha Mn_\beta Co_\gamma A_\delta O_2$ where x ranges from about 0.02 to about 0.25, α ranges from about 0.1 to about 0.4, β range from about 0.35 to about 0.869, γ ranges from about 0.01 to about 0.3, and δ ranges from about 0 to about 0.1, and where A is Mg, Zn, Al, Ga, B, Zr, Ti, Ca, Ce, Y, Nb or combinations thereof, at a temperature from about 150° C. to about 700° C. for at least about 10 minutes to form the oxyfluoride composition. In some embodiments, the fluorine source is $NH_4HF_2$. The data herein provides evidence that the compositions formed using this method are novel and provide desirable battery performance.

In another aspect, the invention pertains to a secondary lithium ion battery comprising a positive electrode, a negative electrode comprising a lithium intercalation/alloy composition, a separator between the positive electrode and the negative electrode and a non-aqueous electrolyte comprising lithium ions. The positive electrode can comprise an active composition represented by a formula $Li_{1+x}Ni_\alpha Mn_\beta Co_\gamma A_\delta O_2$ where x ranges from about 0.02 to about 0.25, α ranges from about 0.1 to about 0.4, β range from about 0.35 to about 0.869, γ ranges from about 0.01 to about 0.3, and δ ranges from about 0 to about 0.1, and where A is Mg, Zn, Al, Ga, B, Zr, Ti, Ca, Ce, Y, Nb or combinations thereof. In some embodiments, the positive electrode active material exhibits a specific capacity of at least about 180 mAh/g when discharged from 4.6 volts to 2.0 volts at room temperature at the 10th cycle at a rate of 1 C.

In other aspects, the invention pertains to a secondary lithium ion battery comprising a positive electrode, a negative electrode comprising a lithium intercalation/alloy composition, a separator between the positive electrode and the negative electrode and a non-aqueous electrolyte comprising lithium ions. The positive electrode can comprise an active composition represented by a formula $Li_{1+x}Ni_\alpha Mn_\beta Co_\gamma A_\delta O_2$ where x ranges from about 0.02 to about 0.25, α ranges from about 0.1 to about 0.4, β range from about 0.35 to about 0.869, γ ranges from about 0.01 to about 0.3, and δ ranges from about 0 to about 0.1, and where A is Mg, Zn, Al, Ga, B, Zr, Ti, Ca, Ce, Y, Nb or combinations thereof. In some embodiments, the positive electrode active material exhibits a specific capacity of at least about 100 mAh/g when discharged from 4.6 volts to 2.0 volts at room temperature at the 20th cycle at a rate of 5 C.

BRIEF DESCRIPTION OF THE DRAWINGS

FIG. 15 is a set of plots of specific discharge capacity as a function of cycle number for up to more than 20 cycles for an undoped sample and samples doped using $NH_4HF_2$ for samples with a reference stoichiometry of $Li_{1.130}Ni_{0.266}Co_{0.152}Mn_{0.451}O_{2-F}F_F$.

FIG. 16 is a set of plots of specific discharge capacity as a function of cycle number for up to more than 20 cycles for an undoped sample and samples doped using $NH_4HF_2$ for samples with a reference stoichiometry of $Li_{1.090}Ni_{0.318}Co_{0.182}Mn_{0.409}O_{2-F}F_F$.

DETAILED DESCRIPTION OF THE INVENTION

Figure 1:
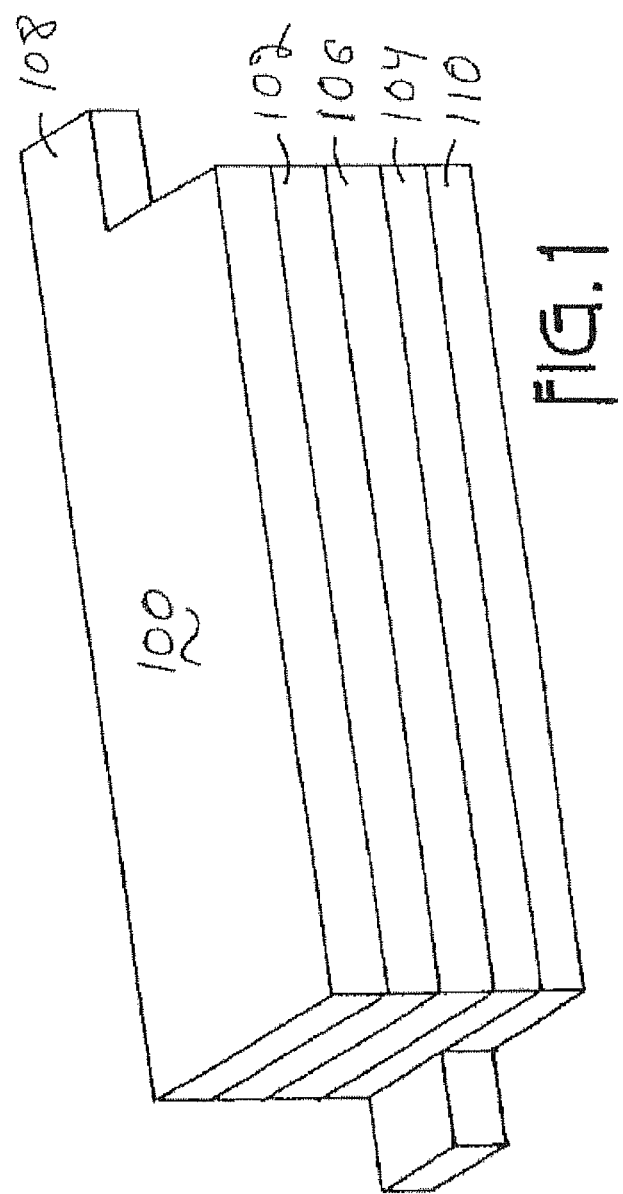
FIG. 1 is a schematic drawing of a battery structure separated from a container.

The lithium rich metal oxyfluoride compositions described herein have ranges of stoichiometry that have been selected to provide desirable properties with respect to high specific capacity as well as excellent cycling properties. In particular, the compositions have been selected to provide a high specific capacity that is stable over a significant number of charge-discharge cycles, and the materials provide good performance at higher discharge rates. Desired compositions are lithium rich relative to a reference stoichiometry of $LiMO_2$, where M is a metal or combination of metals with an average valence of +3. To achieve desired results, the compositions balance several factors. Specifically, the compositions are selected to maintain a high capacity while achieving desirable improvements due to the fluorine doping. Several alternative synthesis approaches are discussed to accomplish the doping. Desirable low temperature processing approaches involve the incorporation of the fluorine dopant into an oxide formed with the desired metal stoichiometry. Suitable processing approaches can be used to make commercial quantities of these materials.

Lithium ion batteries function based on lithium incorporation into and out from the electrode active materials through intercalation, alloying or related types of processes. The term primary battery refers to batteries that are discharged once in use and then discarded for disposal or recycling of materials. The term secondary battery refers to batteries that can be discharged and recharged, generally for many times. Upon discharge, the negative electrode functions as an anode with lithium ions leaving the electrode and the positive electrode functions as a cathode with lithium ions entering the electrode. During charging, the negative electrode functions as a cathode with lithium ions entering the electrode and the positive electrode functions as an anode with lithium ions leaving the electrode. These batteries comprise lithium based electrolytes.

The lithium ion batteries can use a positive electrode active material that is lithium rich relative to a reference homogenous electroactive lithium metal oxide composition, such as $LiMnO_2$. While not wanted to be limited by theory, it is believed that appropriately formed lithium-rich lithium metal oxides can have a composite crystal structure. For example, in some embodiments of lithium rich materials, a $Li_2MnO_3$ material may be structurally integrated with either a layered $LiMnO_2$ component or similar composite compositions with the manganese cations substituted with other transition metal cations with appropriate combinations of oxidation states. In some embodiments, the positive electrode material can be represented in two component notation as $x\,Li_2M'O_3 \cdot (1-x)\,LiMO_2$ where M is one or more metal cations with an average valance of +3 with at least one cation being a Mn ion or Ni ion and where M' is one or more metal cations with an average valance of +4. These general oxide compositions are described further, for example, in U.S. Pat. No. 6,680,143 to Thackeray et al., entitled "Lithium Metal Oxide Electrodes for Lithium Cells and Batteries," incorporated herein by reference. The excess lithium can contribute to additional specific capacity for the material if the material can be stably cycled at higher voltages at which the excess lithium can be extracted from the lattice. Batteries formed form these materials have been observed to cycle at higher voltages and with higher capacities relative to batteries formed with corresponding LiMO$_2$ compositions.

Upon cycling, batteries generally exhibit fade at least over longer numbers of cycles in which the capacity of the battery generally decreases. Once the capacity drops below an acceptable value, the battery is considered expended and generally is discarded or recycled. Improvements in the cycling stability therefore translate into improved lifetimes for the batteries. Higher capacity materials operating at high voltage when fully charged can be particularly difficult to achieve cycling stability. However, it is desirable to increase the specific capacity of batteries that achieve long term cycling stability.

Fluoride doping may provide an approach to stabilize the positive electrode active material with respect to cycling. However, there is conflicting information in the literature regarding fluoride doping in general for positive electrode active metal oxide materials. Approaches for forming some electrode active oxyfluoride compositions have involved the synthesis of the composition through the introduction of lithium fluoride, into the reactant mixture prior to a heat treatment step to form the oxide. A high temperature process to form oxyfluorides is described, for example, for lithium manganese spinel compositions in U.S. Pat. No. 5,674,645 to Amatucci et al., entitled "Lithium Manganese Oxy-Fluorides for Li-Ion Rechargeable Battery Electrodes," and for lithium rich metal oxides in U.S. Pat. No. 7,205,072 to Kang et al., entitled "Layered Cathode Materials for Lithium Ion Rechargeable Batteries," both of which are incorporated herein by reference. The fluoride reactant composition would be present during a high temperature reaction process, generally above at least 800° C.

It has been proposed that fluorine incorporation is reduced or eliminated in higher temperature processing due to volatility of LiF at high reaction temperatures. See Luo et al., "On the incorporation of fluorine into the manganese spinel cathode lattice," Solid State Ionics 180 (2009) 703-707. However, it would seem that reasonable adjustment of the reaction conditions should provide for some fluorine doping through the high temperature process. Also, high temperature stable fluorides, such as MgF$_2$, can be incorporated into the mixture for the high temperature processing. The use of MgF$_2$ as a fluorine dopant source is described in published U.S. patent application 2008/0241693A to Fukuchi et al., entitled "Lithium Transition metal Complex Oxide for Lithium Secondary Battery Cathode Active Material and Method for Producing the Same, Lithium Ion Secondary Battery Cathode Active Material, and Lithium Secondary Battery," incorporated herein by reference.

In alternative approaches, fluorine dopants can be introduced into the oxide following formation of the oxide. These process steps can be performed at lower temperatures. Fluorine doping of a spinel lithium manganese oxide using lithium fluoride and a processing temperature of 650° C. is described in U.S. Pat. No. 6,087,042 to Sugiyama et al., entitled "Positive Electrode Material for Secondary Lithium Battery," incorporated herein by reference. Fluorine doping of spinel lithium manganese oxides using NH$_4$HF$_2$ at lower temperatures of 450° C. is described in published U.S. patent application 2008/0157027A to Manthiram et al., entitled "Cation-Substituted Spinel Oxide and Oxyfluoride Cathodes for Lithium Ion Batteries," (the Manthiram '027 application) and Choi et al., "Superior Capacity Retention Spinel Oxyfluoride Cathodes for Lithium-Ion Batteries," Electrochemical and Solid-State Letters 9 (5) (2006) A245-A248, both of which are incorporated herein by reference.

Positive electrode active materials of particular interest have a formula Li$_{1+x}$Ni$_\alpha$Mn$_\beta$Co$_\gamma$A$_\delta$O$_{2-z}$F$_z$, where x ranges from about 0.02 to about 0.19, $\alpha$ ranges from about 0.1 to about 0.4, $\beta$ range from about 0.35 to about 0.869, $\gamma$ ranges from about 0.01 to about 0.2, $\delta$ ranges from about 0 to about 0.1 and z ranges from about 00.1 to about 0.2, and where A is Mg, Zn, Al, Ga, B, Zr, Ti, Ca, Ce, Y, Nb or combinations thereof. These compositions have a low risk of fire for improved safety properties due to their specific compositions with a layered structure and reduced amounts of nickel. Also, these compositions have low amounts of elements that are less desirable from an environmental perspective, and can be produced from starting materials that have reasonable cost for commercial scale production.

The word "element" is used herein in its conventional way as referring to a member of the periodic table in which the element has the appropriate oxidation state if the element is in a composition and in which the element is in its elemental form, M$^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

Recently, Kang and coworkers described a composition for use in secondary batteries with the formula Li$_{1+x}$Ni$_\alpha$Mn$_\beta$Co$_\gamma$M'$_\delta$O$_{2-z}$F$_z$, M'=Mg, Zn, Al, Ga, B, Zr, or Ti, x between about 0 and 0.3, $\alpha$ between about 0.2 and 0.6, $\beta$ between about 0.2 and 0.6, $\gamma$ between about 0 and 0.3, $\delta$ between about 0 and 0.15 and z between about 0 and 0.2. The metal ranges and fluorine were proposed as improving battery capacity and stability of the resulting layered structure during electrochemical cycling. See, U.S. Pat. No. 7,205,072 to Kang et al., entitled "Layered cathode materials for lithium ion rechargeable batteries," incorporated herein by reference. This reference reported a cathode material with a capacity below 250 mAh/gm (milli-ampere hours per gram) at room temperature. It is noted that at fluorine may substitute for oxygen, the oxidation state of the multivalent metals are lower relative to the oxidation state of the compositions without the fluorine. However, as described above, the fluorine incorporation has been questioned in the literature.

It has been discovered that domains within the broad composition ranges presented by Kang et al. can be identified as providing for desired performance improvements, especially for high discharge rates. In particular, these parameter domains are as follows based on the formula Li$_{1+x}$Ni$_\alpha$Mn$_\beta$Co$_\gamma$O$_{2-z}$F$_z$, with the approximate constraint that x+$\alpha$+$\beta$+$\gamma$=1 for any actual set of selected parameters: x from 0.02 to 0.19, $\alpha$ from 0.1 to 0.4, $\beta$ from 0.35 to 0.869, $\gamma$ from 0.01 to 0.2 and z from 0.001 to 0.2. A person of ordinary skill in the art will recognize that additional sub-ranges within these explicit ranges are contemplated and are within the present disclosure.

Based on the compositions described herein, the reference oxides (z=0) have very high specific capacity and reasonable cycling. Using these appropriately selected reference oxide compositions, modest amounts of fluorine dopant can be used to further stabilize the cycling while maintaining the high specific capacities with high voltage operation. The compositions also with modest amounts of excess lithium provide for a desired increase in the specific capacity while achieving other desirable properties of the materials.

Improved performance has been achieved for positive electrode active materials using co-precipitation approaches. In particular, a carbonate co-precipitation approach involves forming a carbonate intermediate composition, and generally a solution is formed from which a metal carbonate is precipitated with the desired metal stoichiometry. The metal carbonate compositions from co-precipitation can be subsequently heat-treated to form the corresponding metal oxide composition with appropriate crystallinity and with a high tap density. In alternative embodiments, a hydroxide co-precipitation process can be used where a hydroxide is precipitated from solution with a desired metal stoichiometry. The lithium cations can either be incorporated into the initial co-precipitation process, or the lithium can be introduced in a solid state reaction during or following the heat treatment to form the oxide compositions from the carbonate compositions or the hydroxide compositions. The resulting lithium rich metal oxide materials formed with improved co-precipitation processes have been demonstrated to exhibit improved performance properties.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. To compensate for this first cycle irreversible capacity loss, extra electroactive material is included in the negative electrode such that the battery can be fully charged even though this lost capacity is not accessible during most of the life of the battery so that negative electrode material is essentially wasted. A significant portion of the first cycle irreversible capacity loss is generally attributed to the positive electrode material.

The fluorine doped materials exhibit improved performance. In particular, the fluorine doping can provide a higher reversible specific capacity and a reduced irreversible capacity loss. The fluorine tends to reduce irreversible interactions such that improved cycling stability is observed. The improved cycling seems more pronounced at high discharge rates, such as rates of 1 C or greater. The materials doped using a low temperature process described herein exhibit properties that indicate that the materials are different form the materials doped using a high temperature process. While not wanting to be limited by theory, this distinction may be related to more of a surface doping for the low temperature process compared with a bulk doping using the high temperature process. The improved cycling seems more pronounced at high discharge rates, such as rates of 1 C or greater.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials with respect to specific capacity, tap density, and cycling can provide improved performance for consumers, especially for medium current applications.

Battery Structures

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation or similar mechanisms. Desirable mixed metal oxides are described further herein to function as electroactive materials for positive electrodes in secondary lithium ion batteries. Lithium ion batteries refer to batteries in which the negative electrode active material is also a lithium intercalation material. If lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\leq1$ or $Li_{1+x}Ti_{2-x}O_4$, $0\leq x\leq1/3$. Additional negative electrode materials are described in copending patent application Ser. No. 12/502,609 to Kumar, entitled "Composite Compositions, Negative Electrodes with Composite Compositions and Corresponding Batteries," and Ser. No. 12/429,438 to Kumar et al., entitled "High Energy Lithium Ion Batteries with Particular Negative Electrode Compositions," both of which are incorporated herein by reference.

However, with respect to the excellent cycling properties described herein, generally the carbon materials, e.g., graphite, synthetic graphite, coke and/or fullerenes, and lithium titanium oxide are expected to be able to achieve desired long term cycling. Batteries with lithium titanate anode generally operate at a relatively low voltage, so that these materials are expected to result in low energy density batteries. Thus, for long cycling, high energy density batteries of particular interest, the negative electrodes generally comprise an active carbon material, such as graphite, synthetic graphite, hard carbon, coke, fullerenes, carbon nanotubes or other graphitic carbon. Graphitic carbon generally comprises graphene sheets of $sp^2$ bonded carbon atoms. For convenience, as used herein graphitic carbon refers generally to an elemental carbon material comprising substantial domains of graphene sheets.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, ethylene-(propylene-diene monomer) copolymer (EPDM) and mixtures and copolymers thereof.

The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators.

Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C.

Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride and combinations thereof. Traditionally, the electrolyte comprises a 1 M concentration of the lithium salts.

For lithium ion batteries of interest, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

The electrodes described herein can be incorporated into various commercial battery designs. For example, the cathode compositions can be used for prismatic shaped batteries, wound cylindrical batteries, coin batteries or other reasonable battery shapes. The testing in the Examples is performed using coin cell batteries. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Positive Electrode Active Materials

The fluorine doped compositions of particular interest balance beneficial stabilization effects due to the fluorine dopant while essentially maintaining a high capacity of a reference oxide material. To achieve these objectives, the fluorine dopant levels are kept relatively low. It is believed that the fluorine dopant stabilizes the crystal lattice with respect to withdrawal of lithium during battery charging and insertion of lithium during battery discharge. As described further below, the fluorine dopant is believed to substitute for oxygen at lattice sites with a corresponding change in oxidation state of the transition metals to compensate for the lower valance of fluorine relative to oxygen.

Apart from the fluorine doping, a corresponding oxide composition is lithium rich with a moderate amount of lithium enrichment relative to a reference $LiMO_2$ material. The lithium rich oxide compositions can be referred to with an approximate formula $Li_{1+x}M_{1-y}O_2$, where M represents one or more metals and y is related to x based on the average valance of the metals. In some embodiments, the lithium rich compositions generally are believed to form a layered composite crystal structure, and for these embodiments x is approximately equal to y. The layered composite lithium rich materials may be represented in two component notation as x $Li_2M'O_3 \cdot (1-x)LiMO_2$ where M is one or more metal cations with an average valance of +3 with at least one cation being an Mn ion or Ni ion and where M' is one or more metal cations with an average valance of +4. While the excess lithium can contribute to an increase in capacity, the materials described herein have some excess of lithium to achieve a desirable increase in capacity while also having desirable cycling properties. During charging, lithium migrates from the positive electrode and is loaded into the negative electrode active material. With the extra lithium loaded into the negative electrode during charging, these batteries can operate at higher voltages. Thus, these materials provide a desirable high voltage material with higher specific capacities. The fluorine doping can stabilize the cycling of the batteries.

In some embodiments, the compositions comprise Li, Ni, Co and Mn ions optionally along with one or more additional metal ions. Positive electrode active materials of particular interest are approximately represented by a formula $Li_{1+x}Ni_\alpha Mn_\beta Co_\gamma A_\delta O_{2-z}F_z$, where x ranges from about 0.02 to about 0.19, α ranges from about 0.1 to about 0.4, β range from about 0.35 to about 0.869, γ ranges from about 0.01 to about 0.2, δ ranges from about 0 to about 0.1 and z ranges from about 0.001 to about 0.2, and where A is Mg, Zn, Al, Ga, B, Zr, Ti, Ca, Ce, Y, Nb or combinations thereof. In further embodiments, x ranges from about 0.03 to about 0.18 and in other embodiments from about 0.05 to about 0.175. In other embodiments, α ranges from about 0.125 to about 0.375 and in additional embodiments from about 0.15 to about 0.35. In some embodiments, β range from about 0.35 to about 0.70 and in further embodiments from about 0.375 to about 0.60. In additional embodiments, γ ranges from about 0.05 to about 0.2 and in additional embodiments from about 0.075 to about 0.19. If δ is zero, the composition does not comprise any additional metal ions besides Li, Co, Ni, and Mn. If δ is non-zero, δ can range from about 0.001 to about 0.20, in other embodiments from about 0.002 to about 0.15 and in further embodiments from about 0.005 to about 0.10. $Mg^{+2}$ and $Ca^{+2}$ are ions of particular interest for A. A person of ordinary skill in the art will recognize that additional ranges of composition within the explicit ranges above are contemplated and are within the present disclosure.

In the formula above, z represents the amount of fluorine doping. It is believed that the fluorine dopant substitutes for an oxygen anion at the lattice sites. The anions have large ionic radii, and therefore it is believed that the anion dopants would not locate at interstitial sites and anion vacancies are thought not to form in significant numbers. Of course, the replacement of an oxygen anion with a fluorine anion results in a loss of negative charge, and it is believed that a fraction of the manganese has a lower valance, such as a +3 instead of a +4 charge, to compensate and maintain electrical neutrality in view of the loss of negative charge due to the anion dopant. Any impurity phases though can alter the ratio of oxygen and fluorine amounts. Thus, as noted above, the formula is considered to be approximate. Also, z can be in the range of 0.005 to about 0.2, in further embodiments from about 0.01 to about 0.2, in other embodiments from about 0.01 to about 0.15, in additional embodiments form about 0.01 to about 0.10 and in some embodiments from about 0.01 to about 0.075. A person of ordinary skill in the art will recognize that additional ranges of fluorine dopant levels within the explicit ranges above are contemplated and are within the present disclosure.

For embodiments in which $x+\alpha+\beta+\gamma+\delta$ is approximately equal to 1, the composition can be represented in a two component notation as b $Li_2M'O_{3-c}F_c \cdot (1-b)LiMO_{2-d}F_d$, where M is one or more metal elements with an average valance of +3 and M' is a metal element with an average valance of +4. For example, M" can be a combination of $Ni^{+2}$, $Co^{+3}$ and $Mn^{+4}$. If the fluorine doping into the two phases of the lattice is equivalent, then the formulas become $bLi_2M'O_{3-3z/2}F_{3z/2} \cdot (1-b)LiM"O_{2-z}F_z$. However, the fluorine doping is not necessarily equal for the two layered compositions since the lattice sites presumably are not equivalent. The overall formula for these compositions can be written as $Li_{1+b/(2+b)}M'_{2b/(2+b)}M"_{2(1-b)/(2+b)}O_{2-z}F_z$. This formula is consistent with the sum $x+\alpha+\beta+\gamma+\delta$ equal to 1 in the formula of the previous paragraph two paragraphs above where $x=b/(2+b)$. The values of z and b determine the ranges for c and d in the equation above.

For lithium rich layered compositions without fluorine doping, very large specific capacities have been observed for appropriately synthesized materials. Specifically, surprisingly large capacities have been obtained for $Li[Li_{0.2}Ni_{0.175}Co_{0.10}Mn_{0.525}]O_2$, as presented in copending U.S. patent application Ser. No. 12/332,735 to Lopez et al. (the '735 application) entitled "Positive Electrode Material for High Specific Discharge Capacity Lithium Ion Batteries", incorporated herein by reference. The materials in the '735 application were synthesized using a carbonate co-precipitation process. Also, very high specific capacities were obtained for this composition using hydroxide co-precipitation and sol gel synthesis approaches as described in U.S. application Ser. No. 12/246,814 to Venkatachalam et al. (the '814 application) entitled "Positive Electrode Material for Lithium Ion Batteries Having a High Specific Discharge Capacity and Processes for the Synthesis of these Materials", incorporated herein by reference. The fluorine doping is selected to facilitate maintaining this high specific capacity.

The performance of the positive electrode active materials is influenced by many factors. Also, the mean particle size and the particle size distribution are two of the basic properties characterizing the positive electrode active materials, and these properties influence the rate capabilities and tap densities of the materials. Because batteries have fixed volumes, it is therefore desirable that the material used in the positive electrode of these batteries has a high tap density if the specific capacity of the material can be maintained at a desirably high value. Then, the total capacity of the battery can be higher due to the presence of more chargeable material in the positive electrode. The materials described herein generally can be formed with desirable tap densities using the synthesis processes described herein.

As noted above and described in more detail in the following section, the fluorine dopant can be introduced in alternative processes. It is possible that the resulting structure is not the same. It has been proposed in the Manthiram '027 patent application that the high temperature processing for spinel oxides results in the exclusion of fluorine due to the volatility of LiF. The results presented in the examples below for lithium rich layered materials are consistent with there being structural differences between the composition depending on the approach used to introduce the fluorine dopant. It is not clear from the results herein if the differences are due to the lack of fluorine doping and corresponding removal of lithium for the high temperature process or if other structural differences explain the results. For example, while not wanted to be limited by theory, the low temperature process could result in a surface fluorination in contrast with a bulk fluorination through the material for the high temperature process.

Synthesis of Positive Electrode Active Materials

Synthesis approaches described herein can be used to form fluorine doped lithium rich cathode active materials with a desirably large specific capacity upon cycling. The fluorine dopant can be introduced at appropriate times in the procedure. In particular, the fluorine can be introduced after formation of a reference oxide composition in which the doping procedure is a lower temperature process. For some compositions, the fluorine dopant can be introduced into the reactant mixture prior to formation of an oxide composition using a stable higher temperature procedure. The synthesis approaches are also suitable for commercial scale up. Specifically, co-precipitation process can be used to synthesize the desired lithium rich positive electrode materials with desirable metal stoichiometeries and a desired degree of crystallinity resulting in improved material performance in a battery.

In all of the processes described herein, an appropriate stoichiometry of the metals is introduced into the process. As noted above, the fluorine dopant can be introduced in several alternative procedures. The steps involved in forming the oxide composition generally involve relatively high temperatures, so that any fluorine compounds present at these stages of the process should be amenable to high temperature processing. Alternatively, the fluorine dopant can be introduced at later stages of the process after a transition metal oxide is formed so that lower processing temperatures can be used to incorporate the fluorine dopant into the material. As described in detail below, the fluorine dopant can be introduced into a mixed metal oxide along with lithium using lithium fluoride or after lithium is already at desired levels using a non-metal fluoride, such as ammonium bifluoride.

The materials of interest comprise lithium and a plurality of transition metals optionally with additional amounts of other metals. In one step of the process, a mixed metal composition is formed that incorporated the metals, except for possibly lithium, in a desired stoichiometry. This mixed metal composition is processed further into a desired oxide or oxyfluoride with a high level of cystallinity. The initial mixed metal composition can be formed, for example, using a co-precipitation process or a sol-gel process.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 9.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure. Lithium can be co-precipitated with the other metal elements using similar lithium salts if desired, and/or lithium can be introduced subsequently at desired levels.

In the sol-gel approach, metal salts, such as metal acetates or other soluble metal compounds, are again dissolved into an aqueous solvent, such as purified water. In general, it is desirable for the anion of the salt to be selected to decompose during a subsequent heating step so that the anion is removed from the system. In some embodiments, either acetates or nitrates can be used as the soluble metal compounds. The acetate metal salts however are more environmentally benign because of the absence of any toxic gas evolution during the decomposition process to form the oxides. In contrast, nitrates form $NO_x$ gas during the decomposition process. An acid can be added to hydrolyze the metal solution to form a hydroxide network. For example, a glycolic/tartaric acid solution can be used. Ammonium hydroxide can be used to adjust the pH to a value of about 7. The amount of acid and corresponding pH can be selected to control the gel formation process. Some heating of the solution can be used to facilitate the formation of the gel. The resulting gel can be harvested and dried. The gel can be processes similar to the hydroxides above for the formation of the corresponding oxide or oxyfluoride.

The collected metal hydroxide, carbonate or sol-gel powder can then be subjected to a heat treatment to convert the hydroxide or carbonate composition to the corresponding oxide composition with the elimination of water and/or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material during the co-precipitation process in the same way as the other metals. Also, due to the properties of lithium, the lithium element can be incorporated into the material in a solid state reaction at the time of the reaction to form the oxide without adversely affecting the resulting properties of the product composition. Thus, for example, an appropriate amount of lithium source generally as a powder, such as $LiOH.H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material. Further details of the hydroxide co-precipitation process and sol-gel process are described in the '814 application referenced above. Further details of the carbonate co-precipitation process are described in the '735 application referenced above. It has been found that these procedures have achieved lithium rich mixed metal oxide compositions with surprisingly high specific capacities as described in these applications, and the '814 and '735 applications are incorporated herein by reference for there descriptions of the synthesis processes and the improved performance results.

As noted above, lithium fluoride can be volatile, so the introduction of fluorine dopants during the high temperature oxidation steps has been criticized with respect to failing to introduce the desired amounts of fluorine. However, with reasonable control of the oxidation process, the fluorination may be achievable using LiF. Thus, $LiCO_3$ can be mixed with the co-precipitated product along with an appropriate amount of LiF to achieve the desired lithium and fluorine contents of the product material. The temperatures and heating times can be controlled within the ranges above to achieve the desired fluorination along with the conversion to the oxide from the corresponding hydroxides and/or carbonates.

Also, less volatile fluorine sources are available. In particular, $MgF_2$, $SrF_2$, $BeF_2$ and $CaF_2$ are not expected to be volatile at the temperatures used to perform the oxidation as described above. To the extent that Mg, Sr, Be or Ca are desirable metals to introduce into the active material, $MgF_2$, $SrF_2$, $BeF_2$, $CaF_2$ or combinations thereof can be used to provide the fluorine dopants along with corresponding quantities of $Mg^{+2}$ $Sr^{+2}$, $Be^{+2}$ and/or $Ca^{+2}$. These compositions can be mixed with the precipitated mixed metal compositions prior to the heat treatments to form the mixed metal oxide.

In some embodiments, the fluorine dopant can be introduced into the composition following the formation of the oxide composition. Specifically, the fluorine can be introduced into the composition along with additional lithium using LiF. The LiF can be mixed well with the mixed metal oxide composition. Then, the mixture can be heated to a temperature from about 450° C. to about 750° C. and in further embodiments from about 550° C. to about 700° C., for a time from about 1 hr to about 24 hours, and in further embodiments from about 2 hrs to about 16 hrs. A person of ordinary skill in the art will recognize that additional ranges of temperature and time within the explicit ranges above are contemplated and are within the present disclosure. If the composition comprises additional amounts of lithium in addition to the lithium introduced with the fluorine, the additional lithium can be introduced prior to the fluorination reaction as described above, and the total lithium introduced can be selected to yield the selected stoichiometry.

In other embodiments, the fluorine dopant can be introduced after forming the oxides in which all of the desired metal has already been introduced into the composition. A suitable fluorine source can be mixed well with the mixed metal oxide. The suitable fluorine source for this reaction can be free of reaction by products such that the fluorination step does not alter the metal composition of the resulting oxyfluoride. Suitable reactants include, for example, ammonium bifluoride ($NH_4HF_2$), ammonium fluoride ($NH_4F$), ammonium hexafluoroaluminate, nickel (+2) hexafluoro acetylacetonate or mixtures thereof. The fluorine source is mixed with the mixed metal oxide in appropriate amounts to provide the desired degree of fluorination. The mixture is then heated to a temperature from about 150° C. to about 700° C. in further embodiments from about 200° C. to about 500° C., and in other embodiments from about 300° C. to about 475° C., for a time from about 10 minutes to about 24 hours and in additional embodiments from about 1 hr to about 16 hrs. A person of ordinary skill in the art will recognize that additional ranges of temperature and time within the explicit processing temperatures and times above are contemplated and are within the present disclosure.

Furthermore, the particles can be coated to improve the cycling life and shelf stability of resulting batteries. The coating can comprise an oxide, a fluoride or a combination thereof of one or more metals and/or metalloids, such as Al, Bi, Ga, Ge, In, Mg, Pb, Si, Sn, Ti, Tl, Zn, Zr or mixtures thereof. The coating material can be about 0.005 to about 10 weight percent relative to the core particles. Aluminum oxide can be a desirable coating material due to cost and the relatively environmentally benign nature of the material. Surprisingly performance improvements with respect to specific capacity and a decrease in irreversible capacity loss based on coatings of $AlF_3$ are described in the '735 application and the '814 application, which are both cited above, and these applications are incorporated herein by reference with respect to their coating descriptions and the related performance.

The coating can be applied to the powder, for example, in a solution based approach. In some embodiments, the cathode active particles can be dispersed in an aluminum nitrate solution. Then, ammonium hydroxide is added to precipitate aluminum hydroxide onto the particles. The product is heated between 200 and 500° C. to convert the aluminum hydroxide into aluminum oxide. This process can be correspondingly adapted for other coating metal/metalloid elements or mixtures thereof.

Battery Performance

Batteries formed with the positive electrode active materials described herein exhibited excellent performance at higher rates with cycling. Specifically, synthesis approaches described herein are useful for the production of lithium rich positive electrode active materials with improved capacity and excellent cycling properties. As shown in the examples below, the performance depends on the method used to perform the fluorine doping.

The performance of the cells can be described in terms of the specific capacity relative to the positive electrode active composition. In general, various similar testing procedures can be used to evaluate the battery performance. A specific testing procedure is described for the evaluation of the performance values described herein. The testing procedure is described in more detail in the examples below. Specifically, the battery can be cycled between 4.6 volts and 2.0 volts at room temperature. The rate is selected for a particular cycle. The notation C/x implies that the battery is discharged at a rate to fully discharge or charge the battery to the selected voltage value in x hours. The battery capacity depends significantly on the discharge rate, with lose of capacity as the discharge rate increases.

In some embodiments, the positive electrode active material has a specific capacity during the tenth cycle at a room temperature discharge rate of C discharged from 4.6V to 2.0V of at least about 175 milliamp hours per gram (mAh/g), in additional embodiments at least about 180 mAh/g and in further embodiments at least about 185 mAh/g. In some embodiments, the positive electrode active material has a specific capacity during the 20th cycle at a discharge rate of 5 C discharged from 4.6V to 2.0V of at least about 100 mAh/g, in further embodiments at least about 110 mAh/g and in other embodiments at least about 115 mAh/g. A person of ordinary skill in the art will recognize that additional ranges of specific capacity are contemplated and are within the present disclosure. As the examples demonstrate below, the materials with fluorine doping introduced at lower temperature using ammonium bifluoride exhibit better high rate capabilities relative to materials synthesized using LiF dopant source.

EXAMPLES

Example 1

Synthesis of Oxyfluorides with LiF

This example is directed to the synthesis of a lithium metal oxyfluoride with LiF added during the precipitation process to provide a fluorine dopant.

Stoichiometric amounts of metal sulfates ($NiSO_4.xH_2O$, $CoSO_4.xH_2O$, & $MnSO_4.xH_2O$) were dissolved in distilled water to form a metal sulfate aqueous solution. Separately, an aqueous solution containing $Na_2CO_3$ and $NH_4OH$ was prepared. For the formation of the samples, the two solutions were gradually added to a reaction vessel to form metal carbonate precipitates. The reaction mixture was stirred, and the temperature of the reaction mixture was kept at a temperature between room temperature and 80° C. for 2-24 hours. The pH of the reaction mixture was in the range from 6-9. In general, the aqueous metal sulfate solution had a concentration from 1M to 3M, and the aqueous $Na_2CO_3/NH_4OH$ solution had a $Na_2CO_3$ concentration of 1M to 4M and a $NH_4OH$ concentration of 0.2-2M. The metal carbonate precipitate was filtered, washed multiple times with distilled water, and dried at 110° C. for about 16 hrs to form a metal carbonate powder. Specific ranges of reaction conditions for the preparation of the samples are further outlined in Table 1.

TABLE 1

| Reaction Process Condition | Values |
| --- | --- |
| Reaction pH | 6.0-9.0 |
| Reaction time | 2-15 hr |
| Reactor type | Batch |
| Reactor agitation speed | 200-1400 rpm |
| Reaction temperature | RT - 80° C. |
| Concentration of the metal salts | 1-3M |
| Concentration of $Na_2CO_3$ (precipitating agent) | 1-4M |
| Concentration of $NH_4OH$ (chelating agent) | 0.2-2M |
| Flow rate of the metal salts | 1-100 mL/min |
| Flow rate of $Na_2CO_3$ & $NH_4OH$ | 1-100 mL/min |

Appropriate amounts of $Li_2CO_3$ and LiF powders were combined with the dried metal carbonate powder and thoroughly mixed by a Jar Mill, double planetary mixer, or dry powder rotary mixer to form a homogenous powder mixture for roughly 4 hours.

Samples were prepared with a selected amount of lithium and fluorine. A portion, e.g. 5 grams, of the homogenized powders is calcined followed by an additional mixing step to further homogenize the powder formed. The further homogenized powder was again calcined to form the lithium composite oxide. Specific ranges of calcination conditions are further outlined in Table 2.

TABLE 2

| | Calcination Process Condition | Values |
| --- | --- | --- |
| $1^{st}$ Step | temperature | 400-800° C. |
| | time | 1-24 hr |
| | protective gas | Nitrogen or Air |
| | Flow rate of protective gas | 0-50 scfh |
| $2^{nd}$ Step | temperature | 700-1100° C. |
| | time | 1-36 hr |
| | protective gas | Nitrogen or Air |
| | Flow rate of protective gas | 0-50 scfh |

Figure 2:
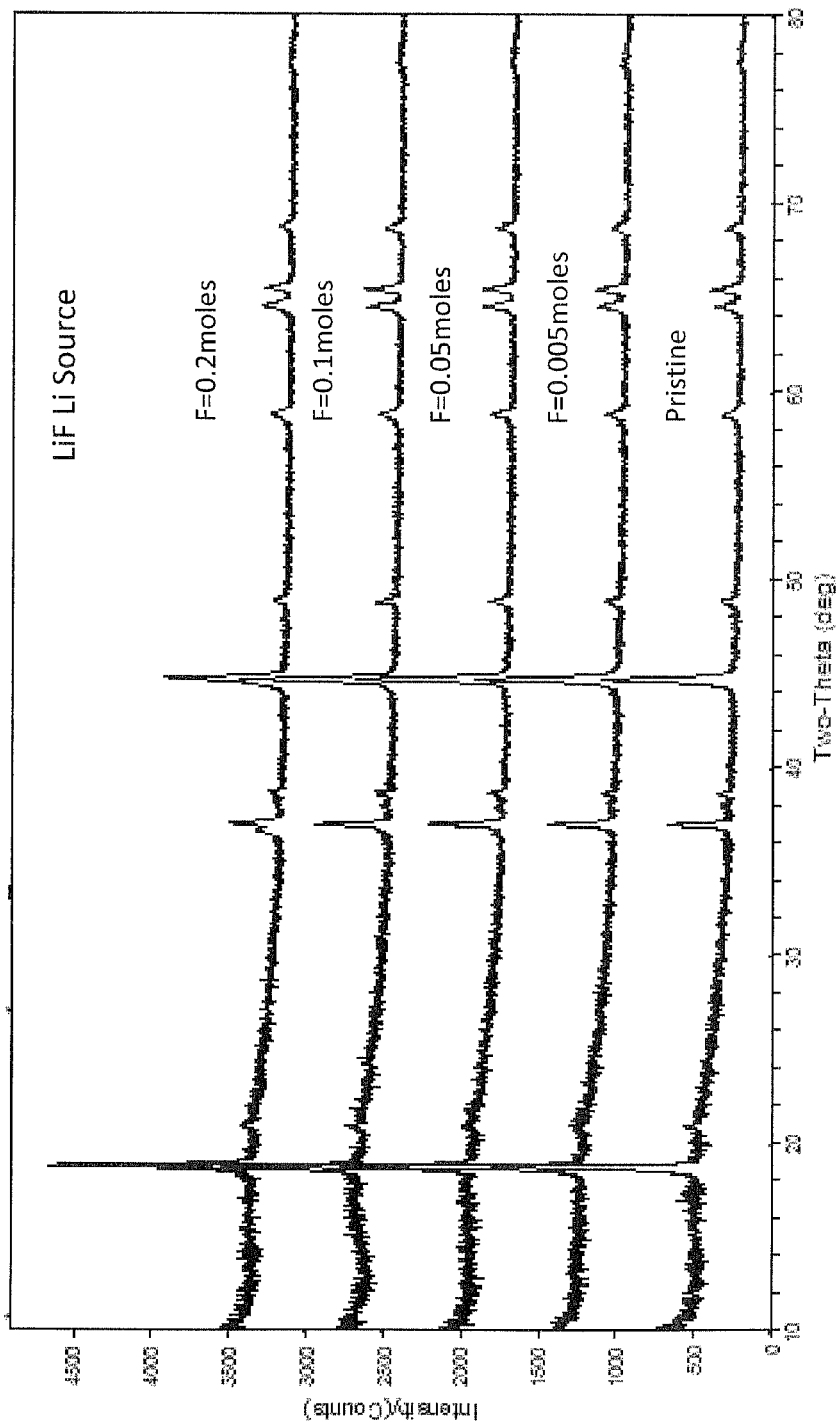
FIG. 2 is a plot of 5 X-ray diffractograms for an undoped sample and 4 samples with a fluorine dopant at different amounts of dopant where the fluorine is introduced using LiF as a fluorine source. The samples had a composition of $Li_{1.20}Ni_{0.175}CO_{0.10}Mn_{0.525}O_{2-F}F_F$, where F indicates the level of fluorine doping
Figure 3:
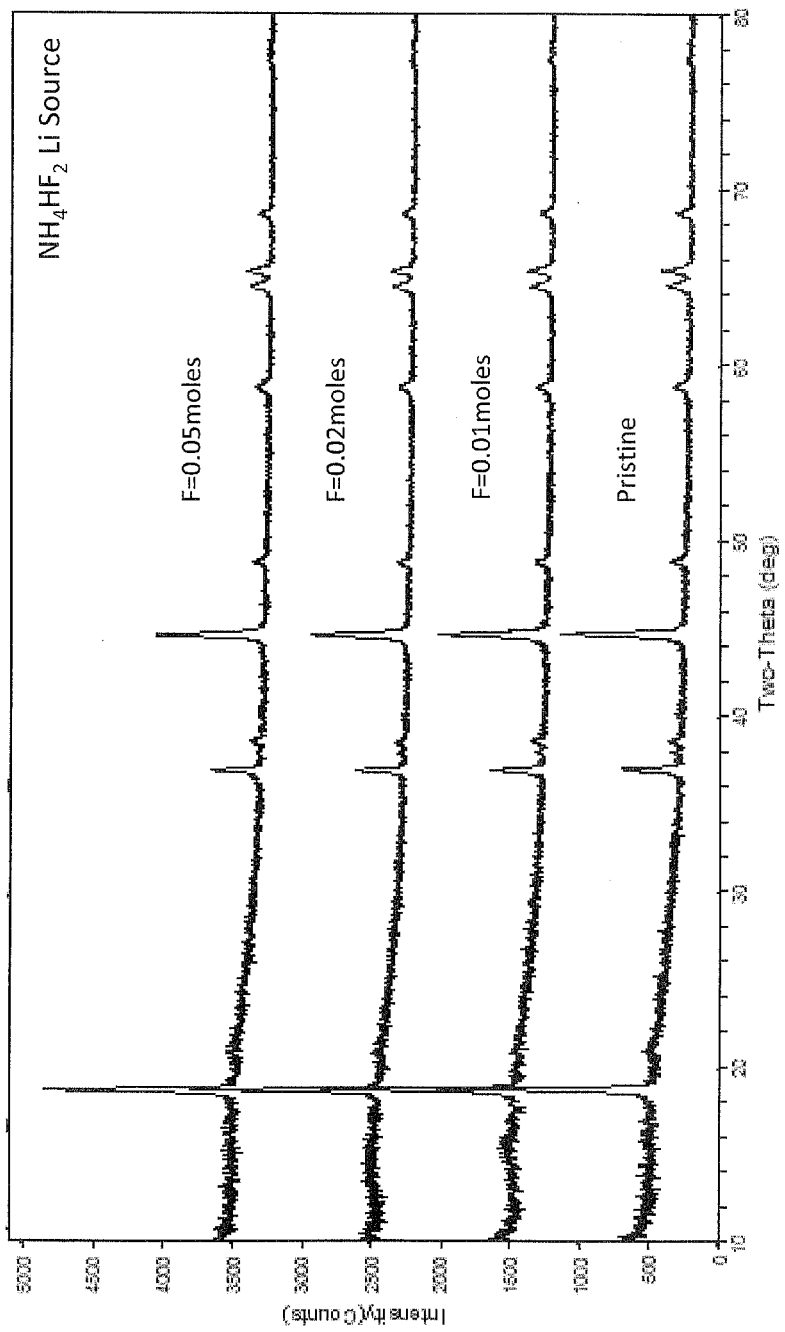
FIG. 3 is a plot of 4 X-ray diffractograms for an undoped sample and 3 samples with a fluorine dopant at different amounts of dopant where the fluorine is introduced using $NH_4HF_2$ as a fluorine source. The samples have a composition of $Li_{1.20}Ni_{0.175}Co_{0.10}Mn_{0.525}O_{2-F}F_F$, where F indicates the level of fluorine doping.
Figure 4:
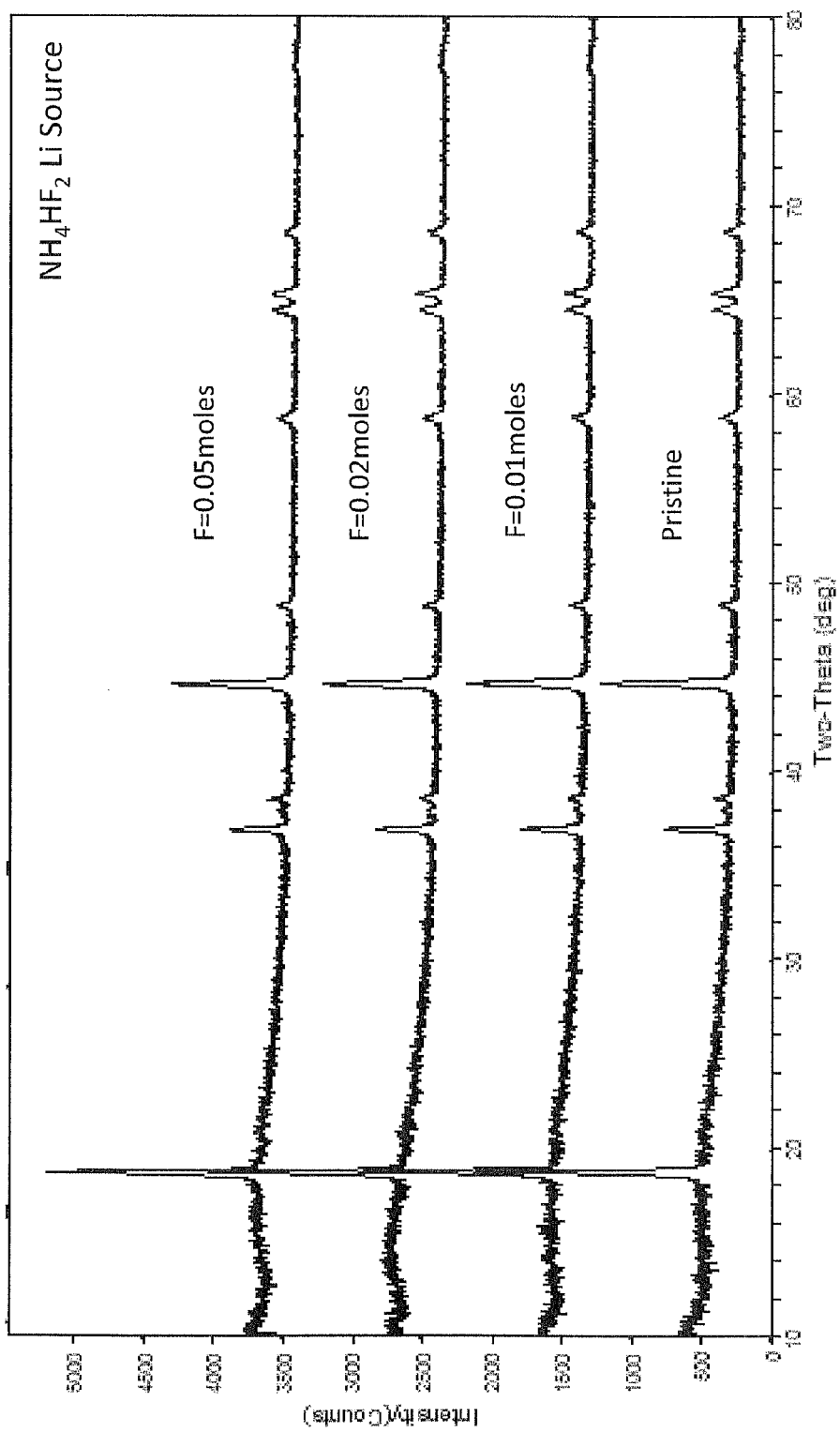
FIG. 4 is a plot of 4 X-ray diffractograms for an undoped sample and 3 samples with a fluorine dopant at different amounts of dopant where the fluorine is introduced using $NH_4HF_2$ as a fluorine source. The samples have a composition of $Li_{1.167}Ni_{0.219}Co_{0.125}Mn_{0.490}O_{2-F}F_F$, where F indicates the level of fluorine doping.
Figure 5:
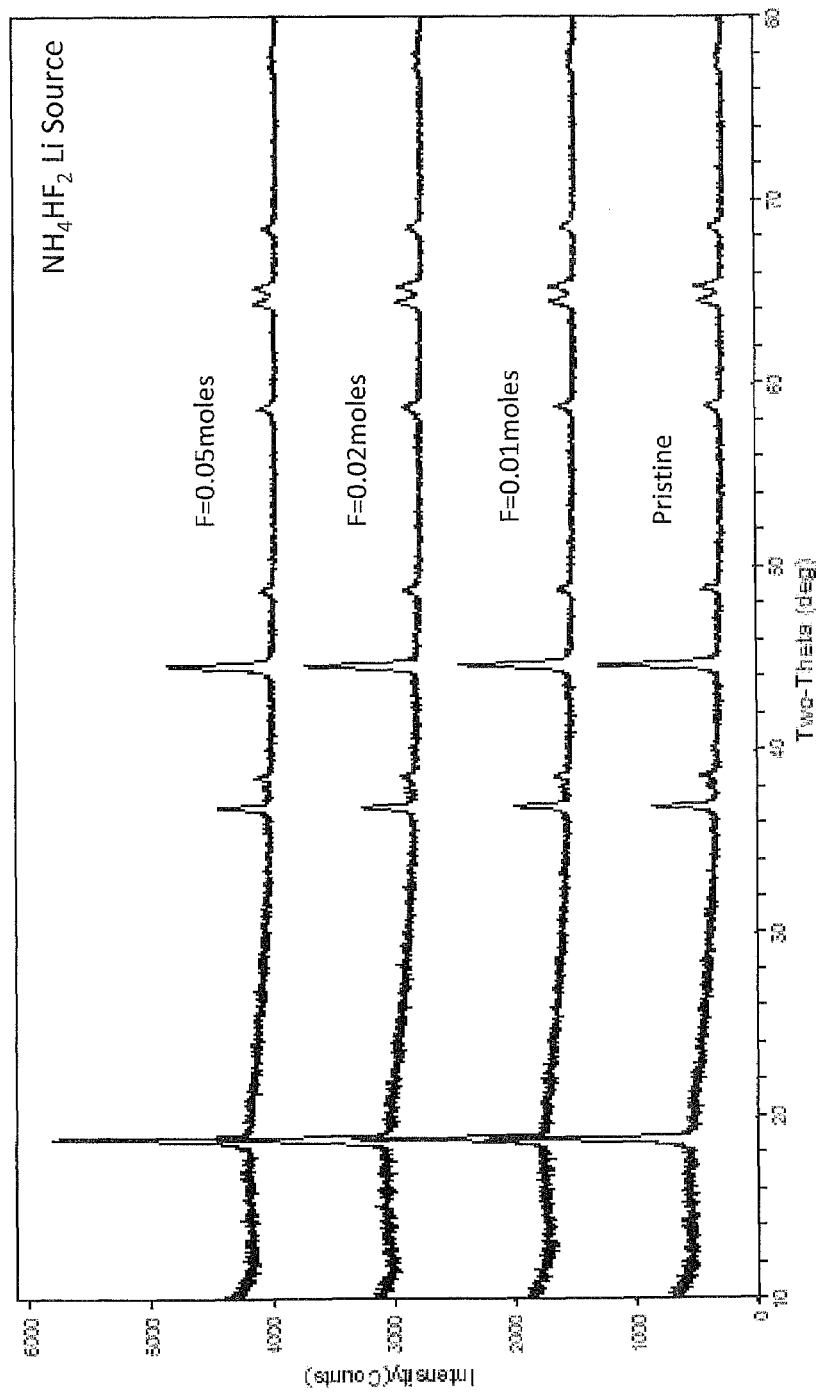
FIG. 5 is a plot of 4 X-ray diffractograms for an undoped sample and 3 samples with a fluorine dopant at different amounts of dopant where the fluorine is introduced using $NH_4HF_2$ as a fluorine source. The samples have a composition of $Li_{1.130}Ni_{0.266}Co_{0.152}Mn_{0.451}O_{2-F}F_F$, where F indicates the level of fluorine doping.
Figure 6:
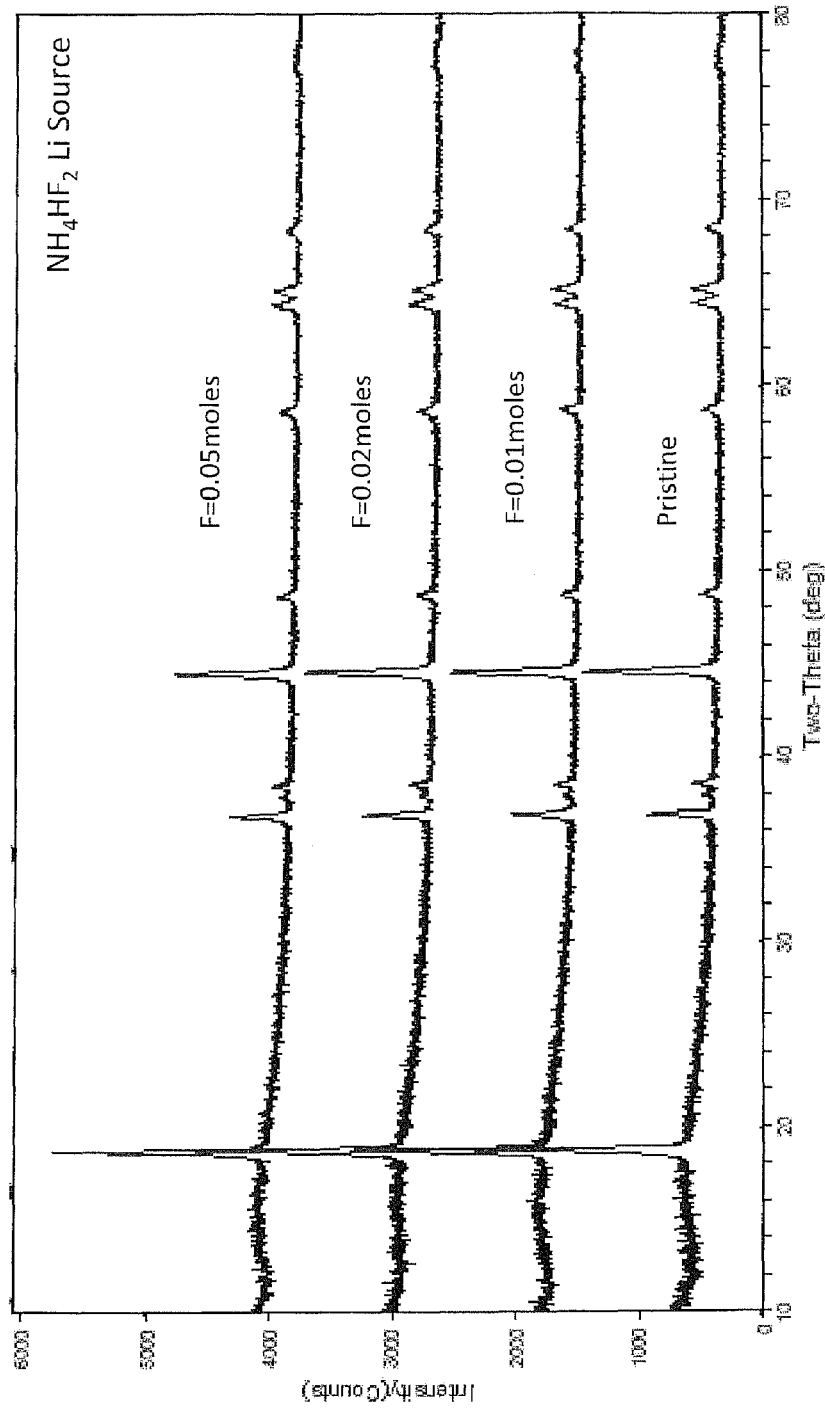
FIG. 6 is a plot of 4 X-ray diffractograms for an undoped sample and 3 samples with a fluorine dopant at different amounts of dopant where the fluorine is introduced using $NH_4HF_2$ as a fluorine source. The samples have a composition of $Li_{1.090}Ni_{0.318}Co_{0.182}Mn_{0.409}O_{2-F}F_F$, where F indicates the level of fluorine doping.

The compositions were selected to have a stoichiometry of approximately $Li_{1.2}Ni_{0.175}CO_{0.10}Mn_{0.525}O_{2-F}F_F$, where F specifies the level of fluorine doping. The amount of fluorine was selected to yield F approximately equal 0 (pristine, i.e. undoped), 0.005, 0.01, 0.02, 0.05, 0.1 or 0.2. X-ray diffractograms of samples formed with lithium at an amount of X=0.5 are shown in FIG. 2 for an un-doped sample and for samples with 4 selected fluorine dopant levels.

Example 2

Synthesis of Oxyfluorides with $NH_4HF_2$

This example demonstrates the synthesis of oxyfluorides following formation of the corresponding oxides using ammonium bifluoride as the fluorine source.

The mixed metal oxides were formed as described in Example 1 using a carbonate co-precipitation process without any LiF. The heating steps were used to form a highly crystalline oxide material. The mixed metal oxide was then mixed with $NH_4HF_2$, and the mixture was heated to a temperature from 150° C. to 700° C. for a period of 10 minutes until 24 hours. The product materials had stoichiometries of approximately $Li_{1.2}Ni_{0.175}Co_{0.10}Mn_{0.525}O_{2-F}F_F$, $Li_{1.167}Ni_{0.219}Co_{0.125}Mn_{0.490}O_{2-F}F_F$, $Li_{1.130}Ni_{0.266}Co_{0.152}Mn_{0.451}O_{2-F}F_F$, or $Li_{1.090}Ni_{0.318}Co_{0.182}Mn_{0.409}O_{2-F}F_F$, where F specifies the level of fluorine doping. X-ray diffractograms were obtained for samples with selected amounts of lithium and fluorine. The diffractograms are shown in FIGS. 3-6. The diffractgrams in FIGS. 2-6 are very similar. At a high fluorine dopant level of F=0.2, as shown in FIG. 2, there are some changes to the diffractograms that are visible at 2-theta between 35-40 degrees.

Example 3

Battery Performance with Oxyfluorides

The coin cell batteries tested in this Example were all performed using coin cell batteries produced following a procedure outlined here. The lithium metal oxide or oxyfluoride powders were produced as described in Examples 1 and 2, which are used as the positive electrode active materials. The positive electrode active materials were mixed thoroughly with acetylene black (Super P™ from Timcal, Ltd, Switzerland) and graphite (KS 6™ from Timcal, Ltd) to form a homogeneous powder mixture. Separately, polyvinylidene fluoride PVDF (KF1300™ from Kureha Corp., Japan) was mixed with N-methyl-pyrrolidone NMP (Honeywell-Riedel-de-Haen) and stirred overnight to form a PVDF-NMP solution. The homogeneous powder mixture was then added to the PVDF-NMP solution and mixed for about 2 hours to form a homogeneous slurry. The slurry was applied onto an aluminum foil current collector to form a thin wet film.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. An example of a positive electrode composition developed using above process having a LMO:acetylene black:graphite:PVDF ratio of 80:5:5:10 is presented below.

The positive electrode was placed inside an argon filled glove box for the fabrication of the coin cell batteries. Lithium foil (FMC Lithium) having thickness of 150 micron was used as a negative electrode. The electrolyte was a 1 M solution of $LiPF_6$ formed by dissolving $LiPF_6$ salt in a mixture of ethylene carbonate, diethyl carbonate and dimethyl carbonate (from Ferro Corp., Ohio USA) at a 1:1:1 volumetric ratio. A trilayer (polypropylene/polyethylene/polypropylene) microporous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

For obtaining the electrochemical data, the batteries were cycled between 2.0V and 4.6V at rates that depended on the particular cycle, 0.1 C (C/10) for cycles 1 and 2, 0.2 C (C/5)

for cycles 3 and 4, 0.33 C (C/3) for cycles 5 and 6, 1 C for cycles 7-11, 2 C for cycles 12-16 and 5 C for cycles 17 and on. Battery testing was performed at room temperature.

Figure 7:
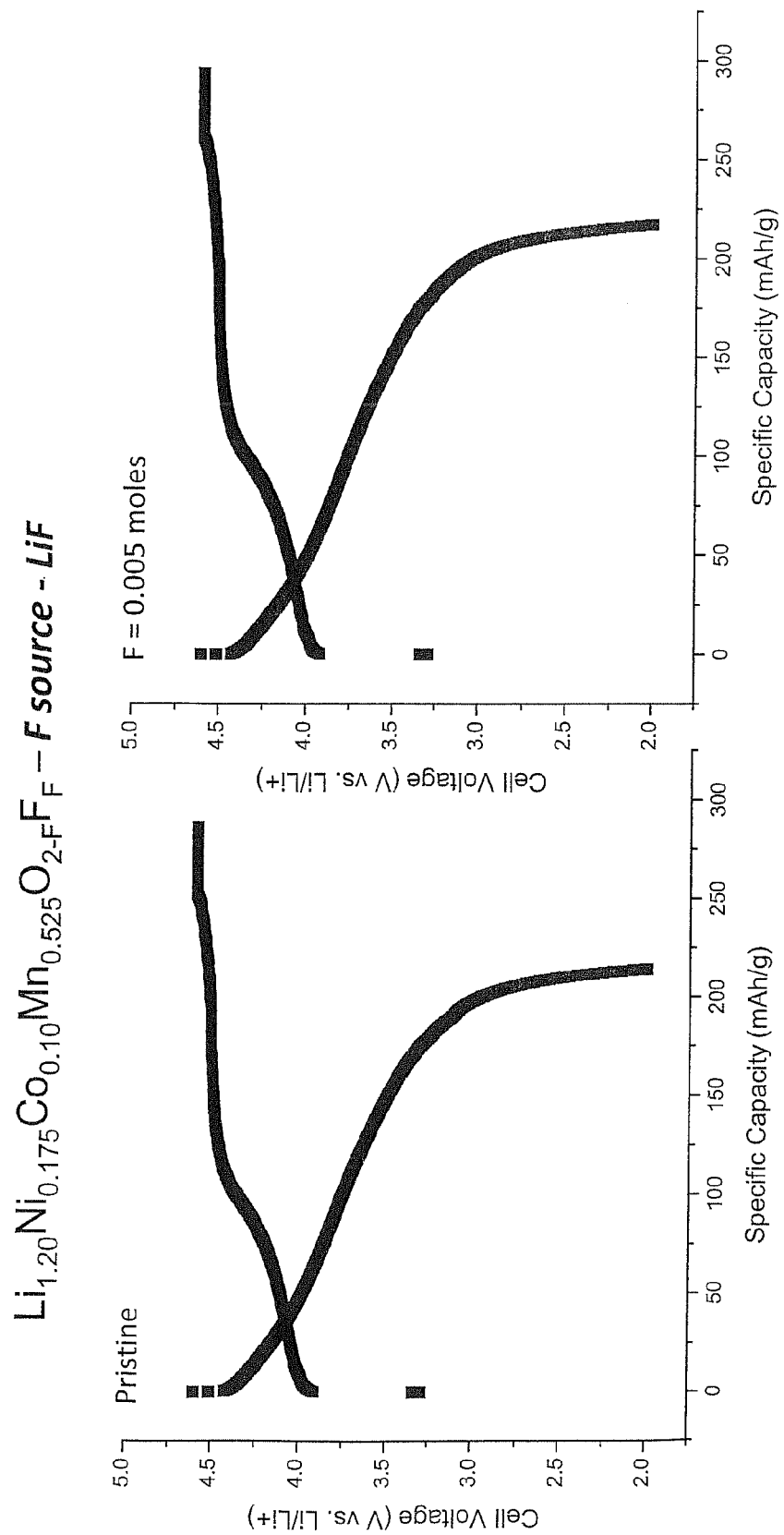
FIG. 7 is a set of two plots a first charge and discharge cycle for a coin cell between 4.6V and 2.0V at a rate of C/10 for a positive electrode active material having a composition $Li_{1.20}Ni_{0.175}Co_{0.10}Mn_{0.525}O_{2-F}F_F$, where F=0 in the left plot and F=0.005 in the right plot where the fluorine is introduced using LiF as the fluorine source.
Figure 8:
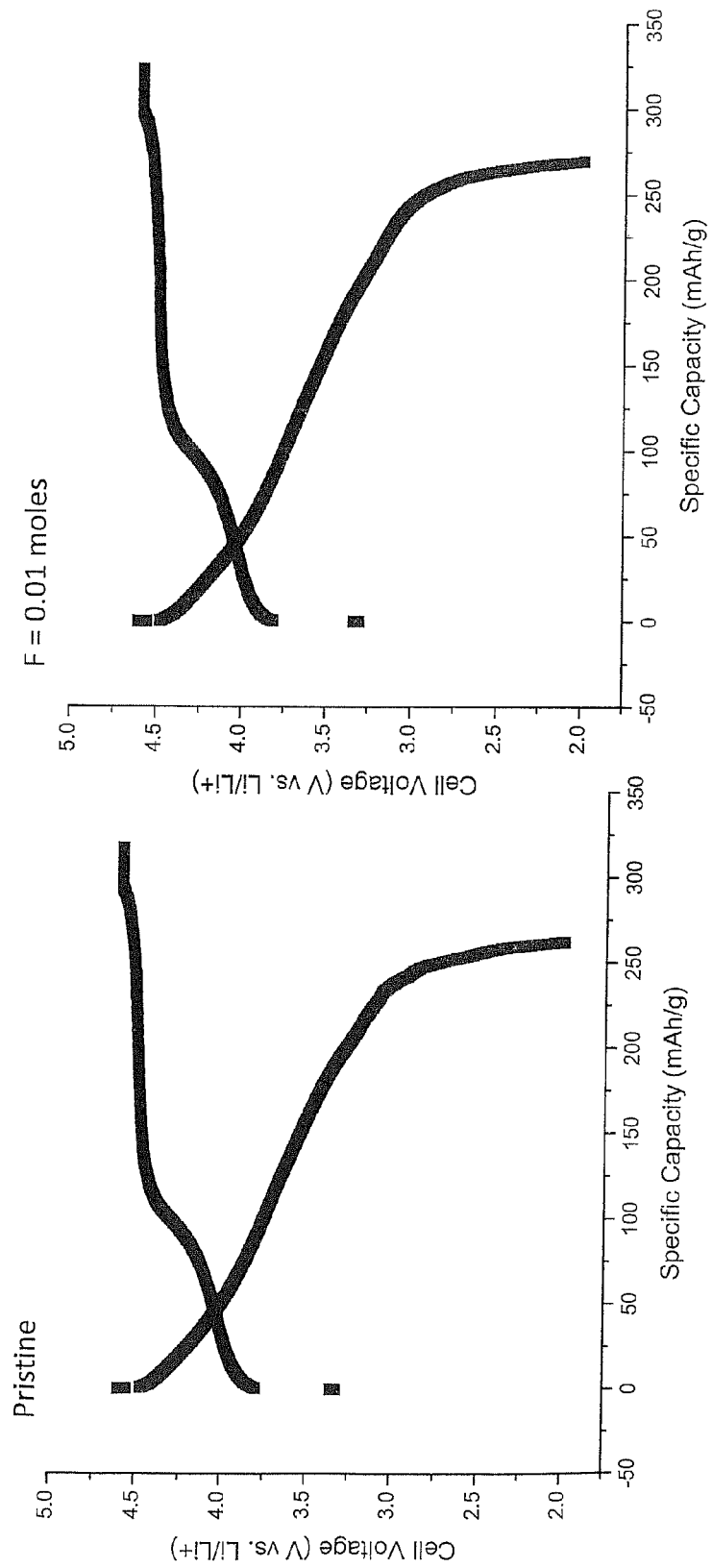
FIG. 8 is a set of two plots a first charge and discharge cycle for a coin cell between 4.6V and 2.0V at a rate of C/10 for a positive electrode active material having a composition $Li_{1.20}Ni_{0.175}Co_{0.10}Mn_{0.525}O_{2-F}F_F$, where F=0 in the left plot and F=0.01 in the right plot where the fluorine is introduced using $NH_4HF_2$ as the fluorine source.
Figure 9:
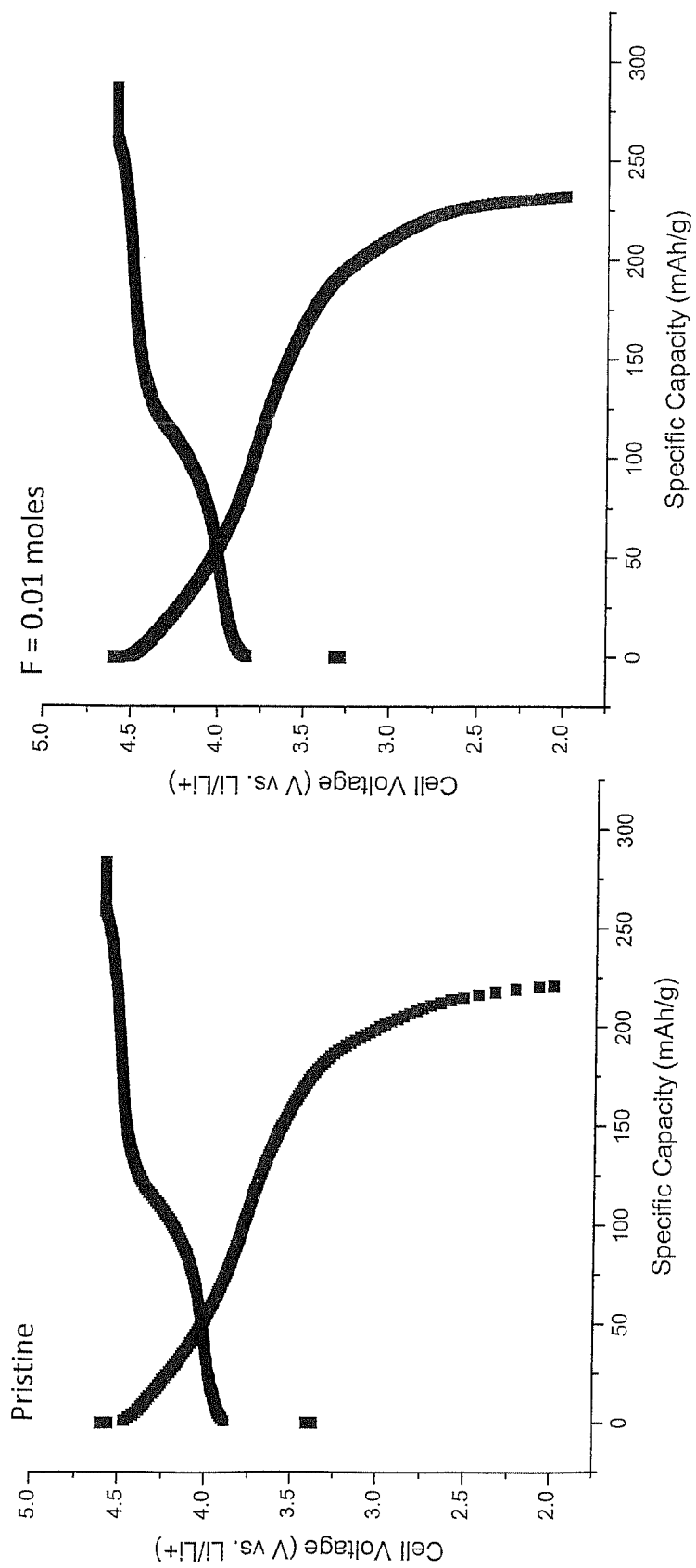
FIG. 9 is a set of two plots a first charge and discharge cycle for a coin cell between 4.6V and 2.0V at a rate of C/10 for a positive electrode active material having a composition $Li_{1.167}Ni_{0.219}Co_{0.125}Mn_{0.490}O_{2-F}F_F$, where F=0 in the left plot and F=0.01 in the right plot where the fluorine is introduced using $NH_4HF_2$ as the fluorine source.
Figure 10:
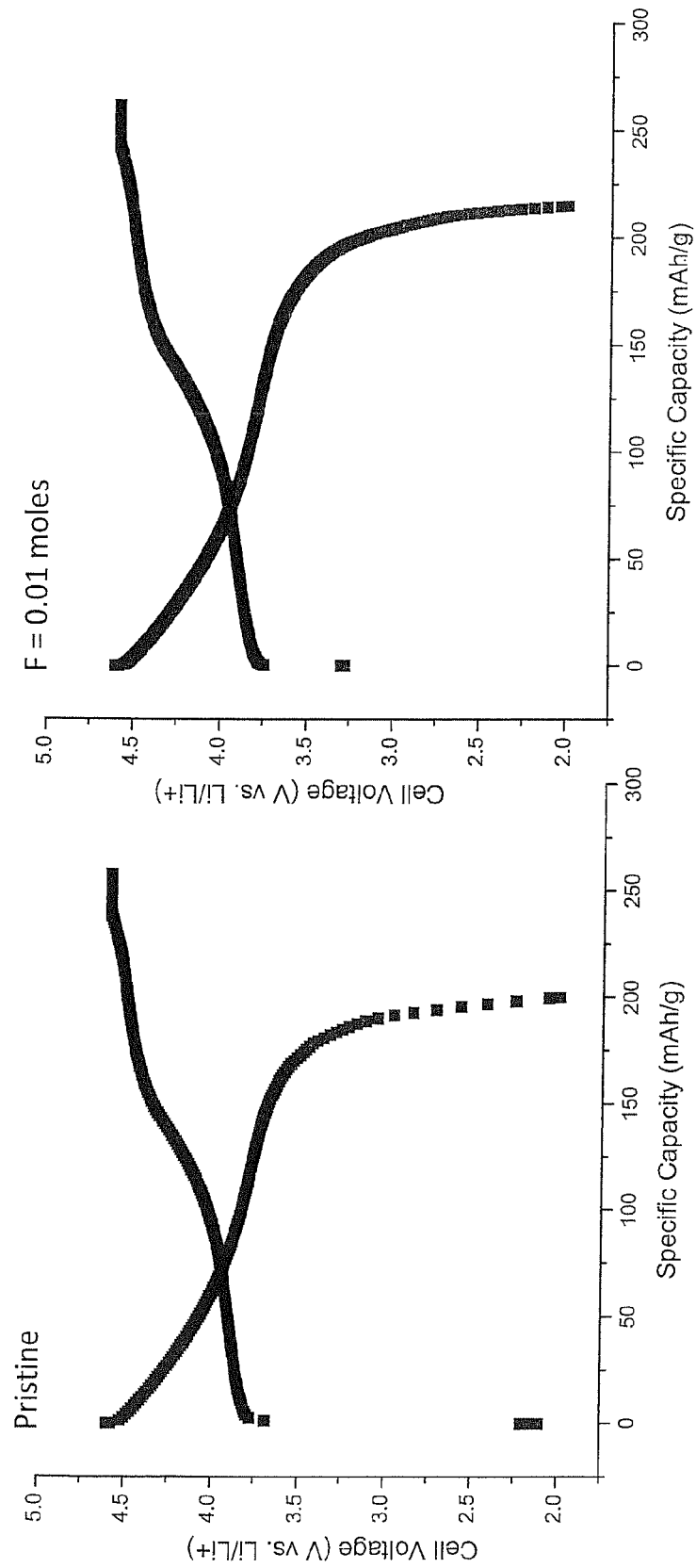
FIG. 10 is a set of two plots a first charge and discharge cycle for a coin cell between 4.6V and 2.0V at a rate of C/10 for a positive electrode active material having a composition $Li_{1.130}Ni_{0.266}Co_{0.152}Mn_{0.451}O_{2-F}F_F$, where F=0 in the left plot and F=0.01 in the right plot where the fluorine is introduced using $NH_4HF_2$ as the fluorine source.
Figure 11:
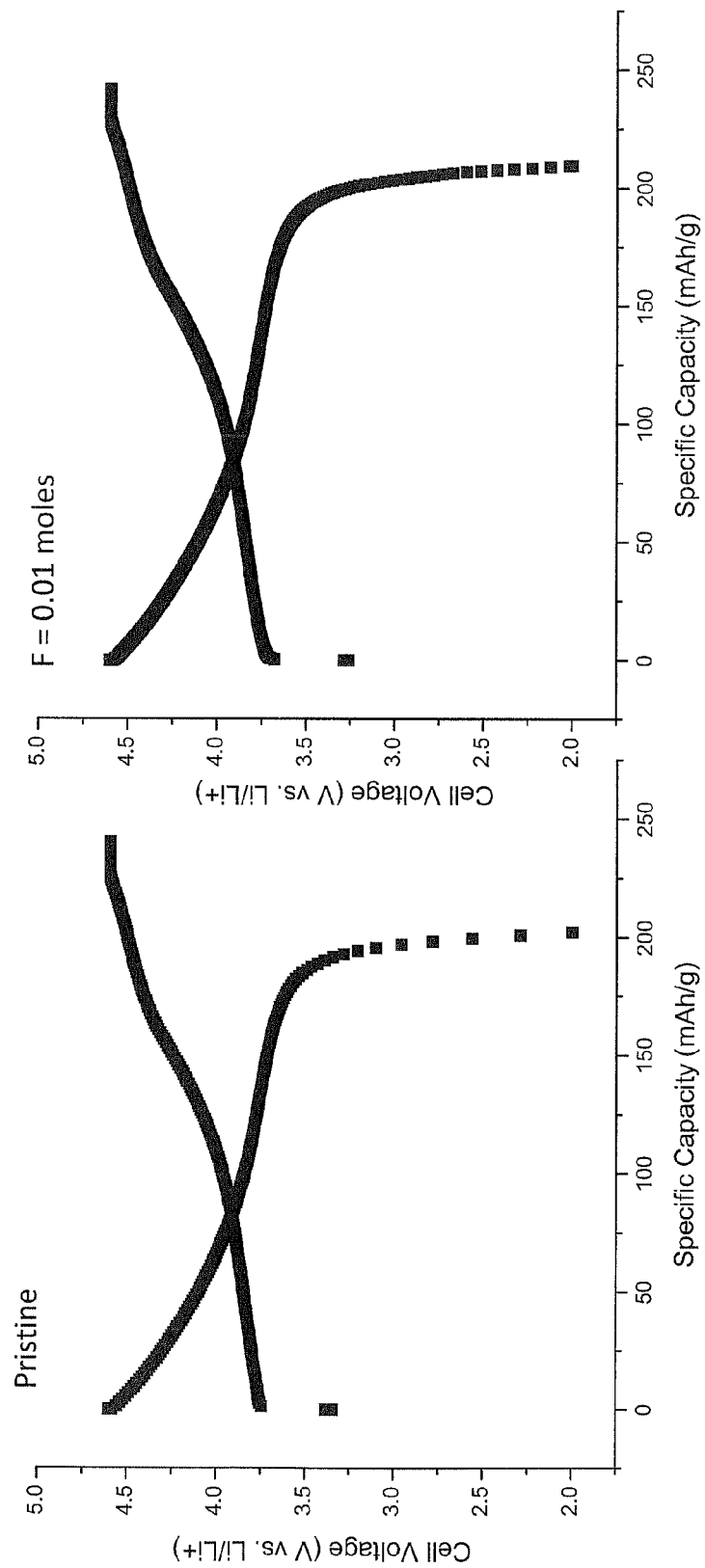
FIG. 11 is a set of two plots a first charge and discharge cycle for a coin cell between 4.6V and 2.0V at a rate of C/10 for a positive electrode active material having a composition $Li_{1.090}Ni_{0.318}Co_{0.182}Mn_{0.409}O_{2-F}F_F$, where F=0 in the left plot and F=0.01 in the right plot where the fluorine is introduced using $NH_4HF_2$ as the fluorine source.

Plots of cell voltage versus specific capacity are presented in FIGS. 7-11 for a first charge and discharge from 2.0 V to 4.6V at a rate of C/10. In each figure, the plot on the left is the first cycle data for an un-doped sample, and the plot on the right is for a sample with a fluorine dopant. FIG. 7 has data for a doped sample that is prepared using LiF as the fluorine source as described in Examiner 1 above. FIGS. 8-11 have data for samples doped with $NH_4HF_2$ as described in Example 2. FIGS. 7 and 8 have data for samples with the composition $Li_{1.2}Ni_{0.175}Co_{0.10}Mn_{0.525}O_{2-F}F_F$, where F=0 in the left plots and F=0.005 (FIG. 7) or F=0.01 (FIG. 8). FIGS. 9-11 have data for compositions, respectively, $Li_{1.167}Ni_{0.219}Co_{0.125}Mn_{0.490}O_{2-F}F_F$, $Li_{1.130}Ni_{0.266}Co_{0.152}Mn_{0.451}O_{2-F}F_F$, and $Li_{1.090}Ni_{0.318}Co_{0.182}Mn_{0.409}O_{2-F}F_F$, where F=0 for the left plots and F=0.01 for the right plots. These results show that the low levels of fluorine doping provide an increase in the first cycle specific capacity. Also, the irreversible capacity loss is reduced through the introduction of the fluorine dopant. The irreversible capacity loss is the different between the capacity of the first charge minus the capacity of the first discharge, which can be seen from FIGS. 7-11.

Figure 12:
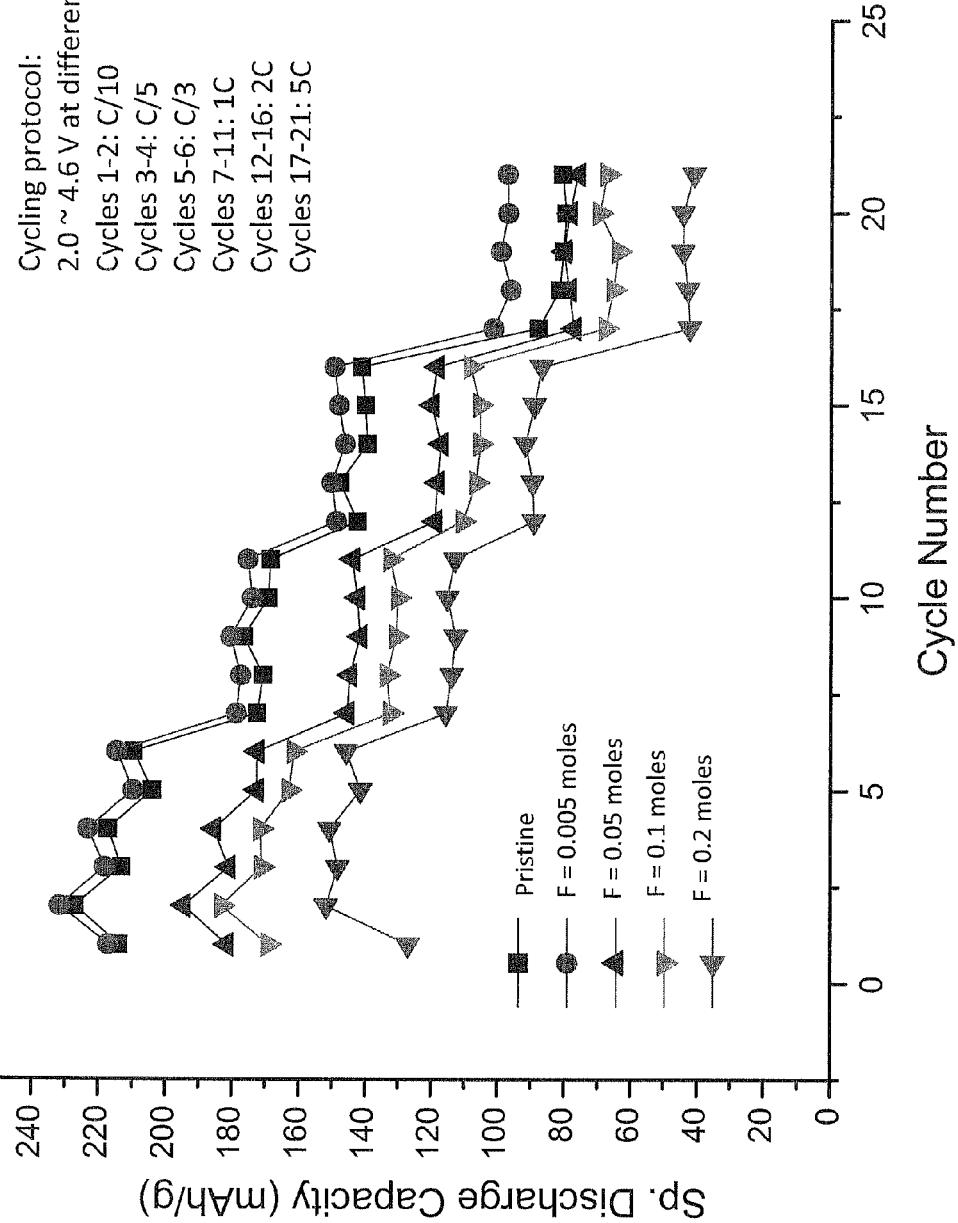
FIG. 12 is a set of plots of specific discharge capacity as a function of cycle number for up to more than 20 cycles for an undoped sample and samples doped using LiF for samples with a reference stoichiometry of $Li_{1.20}Ni_{0.175}Co_{0.10}Mn_{0.525}O_{2-F}F_F$.
Figure 13:
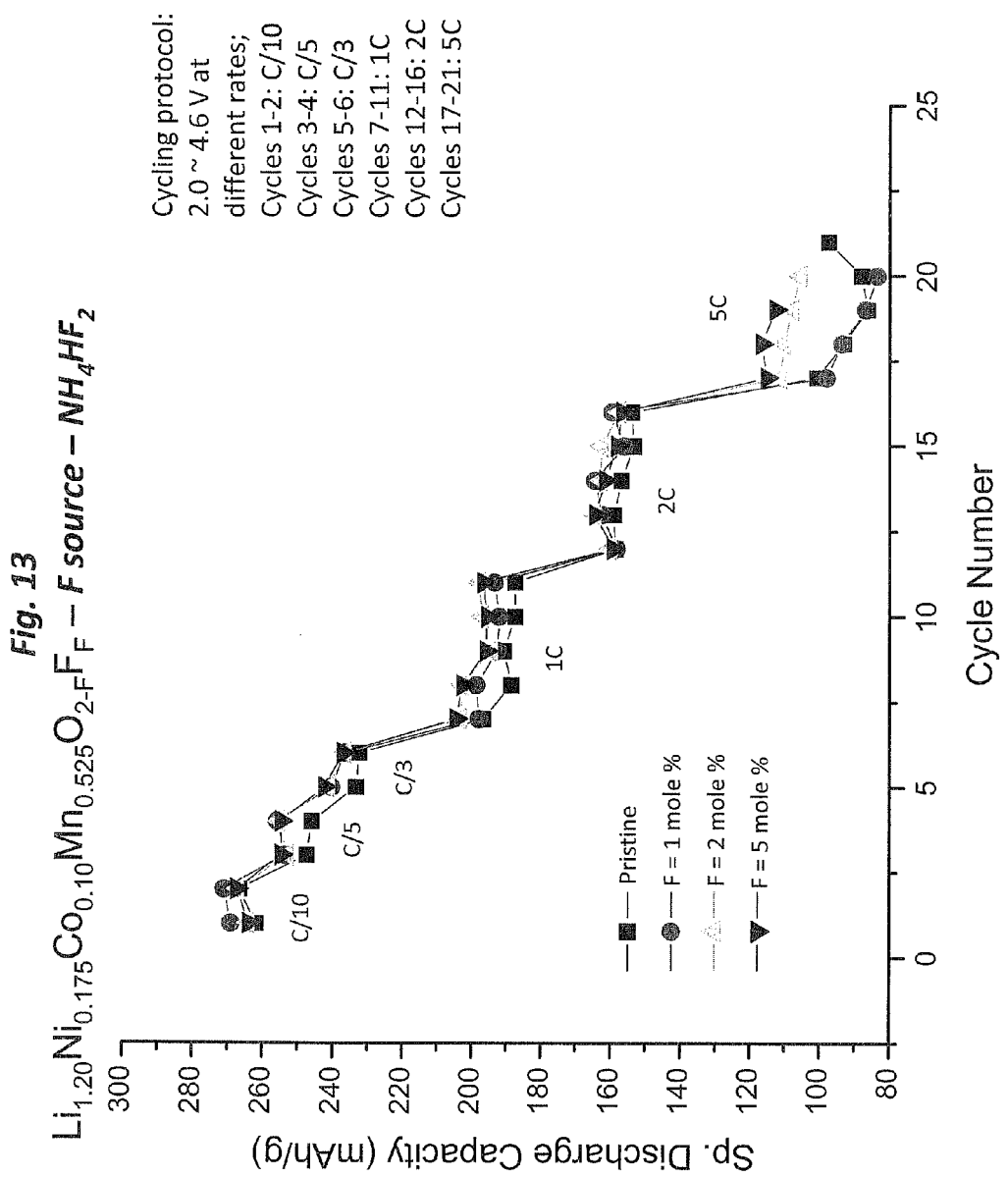
FIG. 13 is a set of plots of specific discharge capacity as a function of cycle number for up to more than 20 cycles for an undoped sample and samples doped using $NH_4HF_2$ for samples with a reference stoichiometry of $Li_{1.20}Ni_{0.175}Co_{0.10}Mn_{0.525}O_{2-F}F_F$.
Figure 14:
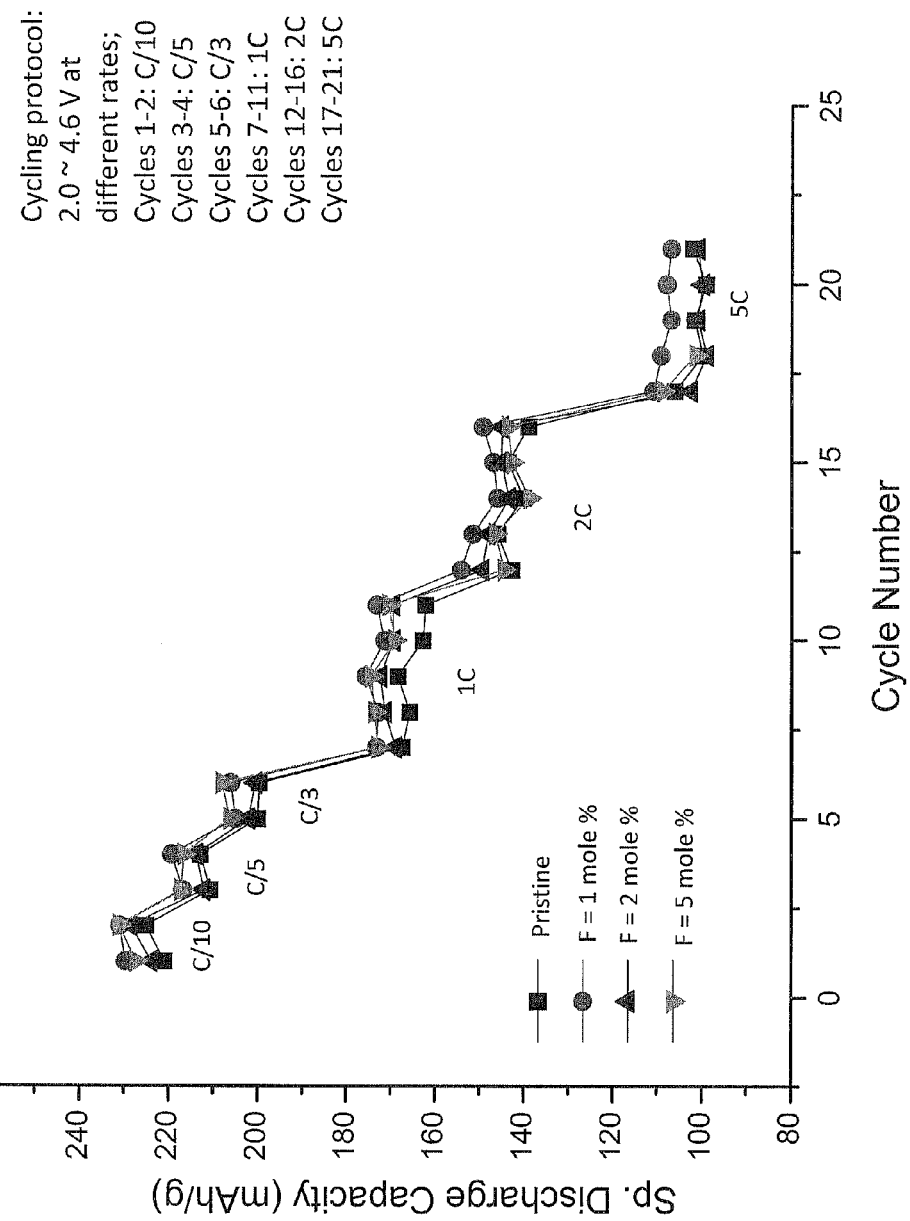
FIG. 14 is a set of plots of specific discharge capacity as a function of cycle number for up to more than 20 cycles for an undoped sample and samples doped using $NH_4HF_2$ for samples with a reference stoichiometry of $Li_{1.167}Ni_{0.219}Co_{0.125}Mn_{0.490}O_{2-F}F_F$.

Specific discharge capacity results for up to over 20 cycles are plotted in FIGS. 12-16. Each plot of the cycling data includes plots of specific discharge capacity as a function of cycle number for undoped samples as well as results for samples doped at multiple fluorine dopant levels. FIG. 12 includes result obtained with samples doped using LiF as the dopant source as described in Example 1. FIGS. 13-16 include results from samples that were doped using ammonium bifluoride as the dopant source. FIGS. 12 and 13 have data for samples with the composition $Li_{1.2}Ni_{0.175}Co_{0.10}Mn_{0.525}O_{2-F}F_F$, where F is specified for specific plots in the figures. FIGS. 14-16 have data for compositions, respectively, $Li_{1.167}Ni_{0.219}Co_{0.125}Mn_{0.490}O_{2-F}F_F$, $Li_{1.130}Ni_{0.266}Co_{0.152}Mn_{0.451}O_{2-F}F_F$, and $Li_{1.090}Ni_{0.318}Co_{0.182}Mn_{0.409}O_{2-F}F_F$, where F is specified for specific plots in the figures.

With respect to the results in FIG. 12, for fluorine dopant introduced with LiF, a low level of F dopant of 0.005 showed a slight increase in specific capacity relative to the undoped sample, although greater amounts of fluorine dopant of F=0.05 or more resulted in a decrease of specific capacity relative to the undoped samples. The fluorine doped samples exhibited less of a decrease in specific capacity with increased cycling. Based on the results in FIGS. 13-16, an increase in the amount of lithium resulted in an increase in the specific discharge capacity for low cycle numbers or lower rates. The introduction of a fluorine dopant using $NH_4HF_2$ results in an increase in specific discharge capacity up to a dopant level of F=0.05.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An electroactive composition comprising a layered crystalline material approximately represented by a formula $Li_{1+x}Ni_\alpha Mn_\beta Co_\gamma A_\delta O_{2-z}F_z$, where:

x is from about 0.02 to about 0.2,
α is from about 0.1 to about 0.4,
β is from about 0.35 to about 0.869,
γ is from about 0.01 to about 0.2,
δ is from 0.0 to about 0.1 and
z is from about 0.01 to about 0.2,
where A is Mg, Zn, Al, Ga, B, Zr, Ti, Ca, Ce, Y, Nb or combinations thereof, and wherein
the electroactive composition exhibits a specific capacity of at least about 175 mAh/g when discharged from 4.6 volts to 2.0 volts at room temperature at the 10 th cycle at a rate of 1C.

2. The electroactive composition of claim 1 wherein x is in the range from about 0.05 to about 0.175.

3. The electroactive composition of claim 1 wherein α is in the range from about 0.15 to about 0.35.

4. The electroactive composition of claim 1 wherein β is in the range from about 0.35 to about 0.60.

5. The electroactive composition of claim 1 wherein γ is in the range from about 0.08 to about 0.2.

6. The electroactive composition of claim 1 wherein z is in the range from about 0.01 to about 0.1.

7. The electroactive composition of claim 1 wherein z is in the range from about 0.01 to about 0.075.

8. The electroactive composition of claim 1 wherein the sum x+α+β+γ+δ is approximately equal to 1.

9. The electroactive composition of claim 8 wherein the composition has a layer layer structure represented by a $Li_2MO_3 \cdot (1-a) LiM'O_2$.

10. A battery comprising a positive electrode comprising a composition of claim 1, a negative electrode comprising a lithium intercalation alloy material and an electrolyte comprising lithium cations.

11. A method for synthesizing the electroactive composition of claim 1, the method comprising heating a fluorine source in contact with a metal oxide approximately represented by a formula $Li1+xNi\alpha Mn\beta Co\gamma A\delta O2$ where x ranges from about 0.02 to about 0.2, α ranges from about 0.1 to about 0.4, β range from about 0.35 to about 0.869, γ ranges from about 0.01 to about 0.2, and δ ranges from about 0 to about 0.1, and where A is Mg, Zn, Al, Ga, B, Zr, Ti, Ca, Ce, Y, Nb or combinations thereof, at a temperature from about 150° C. to about 700° C. for at least about 10 minutes to form the electroactive composition.

12. The method of claim 11 wherein the fluorine source comprises $NH_4HF_2$.

13. The method of claim 11 wherein the heating is performed at a temperature from about 350° C. to about 500° C.

14. The method of claim 11 wherein the heating is performed for about 2 hours to about 10 hours.

15. The method of claim 11 wherein the fluorine source and the metal oxide composition are blended as powders prior to the heating step.

16. The method of claim 11 wherein x is from about 0.05 to about 0.175, α is from about 0.15 to about 0.35, β is from about 0.35 to about 0.70, γ is from about 0.05 to about 0.2, and z is from about 0.01 to about 0.075.

17. The method of claim 11 wherein the sum x+α+β+γ+δ is approximately equal to 1.

18. An electroactive composition synthesized according to the method of claim 16.

19. A secondary lithium ion battery comprising a positive electrode, a negative electrode comprising a lithium intercalation/alloy composition, a separator between the positive electrode and the negative electrode and a non-aqueous electrolyte comprising lithium ions, wherein the positive electrode comprises the electroactive composition of claim 1 that exhibits a specific capacity of at least about 180 mAh/g when discharged from 4.6 volts to 2.0 volts at room temperature at the 10th cycle at a rate of 1C.

20. The secondary lithium ion battery of claim 19 wherein x is from about 0.05 to about 0.175, α is from about 0.15 to about 0.35, β is from about 0.35 to about 0.70, γ is from about 0.05 to about 0.2, δ is from 0.0 to about 0.1 and z is from about 0.01 to about 0.075.

21. The secondary lithium ion battery of claim 19 wherein the negative electrode comprises graphitic carbon.

22. A secondary lithium ion battery comprising a positive electrode, a negative electrode comprising a lithium intercalation alloy composition, a separator between the positive electrode and the negative electrode and a non-aqueous electrolyte comprising lithium ions, wherein the positive electrode comprises the electroactive compositions of claim 1 that exhibits a specific capacity of at least about 100 mAh g when discharged from 4.6 volts to 2.0 volts at room temperature at the 20th cycle at a rate of 5C.

23. The secondary lithium ion battery of claim 22 wherein x is from about 0.05 to about 0.175, α s from about 0.15 to about 0.35, β is from about 0.35 to about 0.70, γ is from about 0.05 to about 0.2, δ is from 0.0 to about 0.1 and z is from about 0.01 to about 0.075.

24. The secondary lithium ion battery of claim 22 wherein the negative electrode comprises graphitic carbon.

* * * * *